(12) United States Patent
He et al.

(10) Patent No.: US 12,443,032 B2
(45) Date of Patent: Oct. 14, 2025

(54) EYE TRACKING WITH SWITCHABLE GRATINGS

(71) Applicant: Meta Platforms Technologies, LLC, Menlo Park, CA (US)

(72) Inventors: Sihui He, Sunnyvale, CA (US); Jacques Gollier, Sammamish, WA (US); Maxwell Parsons, Seattle, WA (US); Babak Amirsolaimani, Redmond, WA (US); Wanli Chi, Sammamish, WA (US); Daniel Guenther Greif, Redmond, WA (US); Renate Eva Klementine Landig, Seattle, WA (US); Xiayu Feng, Kirkland, WA (US); Zhimin Shi, Bellevue, WA (US); Nicholas John Diorio, Duvall, WA (US); Yang Yang, Redmond, WA (US); Giuseppe Calafiore, Redmond, WA (US); Fenglin Peng, Redmond, WA (US); Tanya Malhotra, Redmond, WA (US); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/697,600

(22) Filed: Mar. 17, 2022

(65) Prior Publication Data
US 2023/0176444 A1 Jun. 8, 2023

Related U.S. Application Data

(60) Provisional application No. 63/286,230, filed on Dec. 6, 2021, provisional application No. 63/286,381, filed on Dec. 6, 2021.

(51) Int. Cl.
*G06T 7/00* (2017.01)
*F21V 8/00* (2006.01)
(Continued)

(52) U.S. Cl.
CPC .......... *G02B 27/0093* (2013.01); *G01B 11/22* (2013.01); *G01S 7/4865* (2013.01);
(Continued)

(58) Field of Classification Search
CPC ............. G02B 27/0093; G02B 6/0016; G02B 6/0031; G02B 6/0035; G02B 6/005;
(Continued)

(56) References Cited

U.S. PATENT DOCUMENTS

| 6,400,885 | B1 | 6/2002 | Hu et al. | |
|---|---|---|---|---|
| 7,884,977 | B2 * | 2/2011 | Mori | H04N 19/12 358/538 |

(Continued)

FOREIGN PATENT DOCUMENTS

| CN | 210323583 U | 4/2020 |
|---|---|---|
| CN | 113075793 A | 7/2021 |

(Continued)

OTHER PUBLICATIONS

Aalizadeh M., et al., "Toward Electrically Tunable, Lithography-Free, Ultra-Thin Color Filters Covering the Whole Visible Spectrum," Scinetific Reports, vol. 8, No. 1, Jul. 27, 2018, 11 pages.

(Continued)

*Primary Examiner* — Frank F Huang
(74) *Attorney, Agent, or Firm* — Greenberg Traurig, LLP

(57) ABSTRACT

A switchable grating may be used to redirect illuminating light for illuminating a user's eye in an eye tracking system, to facilitate the determination of eye position and/or orientation. The eye tracking system may be used in a near-eye display. An eye tracking camera obtains an eye image, and (Continued)

a controller performs an initial determination of the eye position. The controller may switch the switchable grating to direct the illuminating light beam onto the eye, for a better position and/or eye orientation determination.

20 Claims, 13 Drawing Sheets

(51) Int. Cl.

| | |
|---|---|
| *G01B 11/22* | (2006.01) |
| *G01S 7/4865* | (2020.01) |
| *G01S 17/10* | (2020.01) |
| *G02B 6/35* | (2006.01) |
| *G02B 26/08* | (2006.01) |
| *G02B 27/00* | (2006.01) |
| *G02B 27/01* | (2006.01) |
| *G02B 27/42* | (2006.01) |
| *G02B 27/44* | (2006.01) |
| *G02F 1/1335* | (2006.01) |
| *G02F 1/29* | (2006.01) |
| *G02F 1/33* | (2006.01) |
| *G02F 1/335* | (2006.01) |
| *G03H 1/02* | (2006.01) |
| *G06F 1/16* | (2006.01) |
| *G06F 3/01* | (2006.01) |
| *G06T 3/4038* | (2024.01) |
| *G06T 7/246* | (2017.01) |
| *G09G 3/00* | (2006.01) |
| *G09G 3/34* | (2006.01) |
| *H04N 23/56* | (2023.01) |
| *H04N 23/698* | (2023.01) |
| *H04N 23/10* | (2023.01) |

(52) U.S. Cl.
CPC ............ *G01S 17/10* (2013.01); *G02B 6/0016* (2013.01); *G02B 6/0031* (2013.01); *G02B 6/0035* (2013.01); *G02B 6/005* (2013.01); *G02B 6/0066* (2013.01); *G02B 6/3518* (2013.01); *G02B 26/0816* (2013.01); *G02B 27/0081* (2013.01); *G02B 27/0172* (2013.01); *G02B 27/0179* (2013.01); *G02B 27/4205* (2013.01); *G02B 27/44* (2013.01); *G02F 1/133504* (2013.01); *G02F 1/133526* (2013.01); *G02F 1/292* (2013.01); *G02F 1/294* (2021.01); *G02F 1/33* (2013.01); *G02F 1/335* (2013.01); *G03H 1/0248* (2013.01); *G06F 1/163* (2013.01); *G06F 3/013* (2013.01); *G06T 3/4038* (2013.01); *G06T 7/246* (2017.01); *G09G 3/002* (2013.01); *G09G 3/3413* (2013.01); *H04N 23/56* (2023.01); *H04N 23/698* (2023.01); *G02B 2027/0105* (2013.01); *G02B 2027/0138* (2013.01); *G02B 2027/0174* (2013.01); *G02B 2027/0178* (2013.01); *G02B 2027/0187* (2013.01); *G06T 2207/30201* (2013.01); *G09G 2310/0235* (2013.01); *H04N 23/10* (2023.01)

(58) Field of Classification Search
CPC .............. G02B 6/0066; G02B 6/3518; G02B 26/0816; G02B 27/0081; G02B 27/0172; G02B 27/0179; G02B 27/4205; G02B 27/44; G02B 2027/0105; G02B 2027/0138; G02B 2027/0174; G02B 2027/0178; G02B 2027/0187; G02B 27/017; G01B 11/22; G01S 7/4865; G01S 17/10; G02F 1/133504; G02F 1/133526; G02F 1/292; G02F 1/294; G02F 1/33; G02F 1/335; G03H 1/0248; G06F 1/163; G06F 3/013; G06T 3/4038; G06T 7/246; G06T 2207/30201; G09G 3/002; G09G 3/3413; G09G 2310/0235; H04N 23/56; H04N 23/698; H04N 23/10
See application file for complete search history.

(56) References Cited

U.S. PATENT DOCUMENTS

| | | | |
|---|---|---|---|
| 8,086,044 B2 * | 12/2011 | Feng .................... | H04N 19/176 |
| | | | 382/220 |
| 8,878,773 B1 * | 11/2014 | Bozarth ............... | G06V 10/143 |
| | | | 382/103 |
| 9,274,597 B1 * | 3/2016 | Karakotsios .......... | G06F 3/0346 |
| 9,557,568 B1 * | 1/2017 | Ouderkirk .......... | G02B 27/0081 |
| 9,664,824 B2 | 5/2017 | Simmonds et al. | |
| 10,108,014 B2 | 10/2018 | Vallius et al. | |
| 10,217,286 B1 * | 2/2019 | Angel ...................... | G06F 3/013 |
| 10,295,723 B1 | 5/2019 | Lee et al. | |
| 10,466,484 B1 * | 11/2019 | Yoon .................... | H04N 13/332 |
| 10,466,779 B1 * | 11/2019 | Liu .................... | G02B 27/0093 |
| 10,502,963 B1 * | 12/2019 | Noble ................ | B29D 11/0073 |
| 10,571,699 B1 | 2/2020 | Parsons et al. | |
| 10,712,576 B1 | 7/2020 | McEldowney | |
| 10,775,633 B1 | 9/2020 | Lee et al. | |
| 10,838,132 B1 | 11/2020 | Calafiore et al. | |
| 10,885,843 B1 * | 1/2021 | Lu ......................... | G09G 3/3266 |
| 10,890,823 B1 | 1/2021 | Jiang et al. | |
| 11,120,728 B2 * | 9/2021 | Nagasaki .............. | G09G 3/2003 |
| 11,176,367 B1 * | 11/2021 | Fix ........................ | G06T 7/521 |
| 11,393,430 B2 * | 7/2022 | Nagasaki .................. | G09G 3/32 |
| 2004/0227838 A1 | 11/2004 | Atarashi et al. | |
| 2007/0188837 A1 | 8/2007 | Shimizu et al. | |
| 2008/0143820 A1 * | 6/2008 | Peterson ................. | G06T 11/60 |
| | | | 348/E7.001 |
| 2008/0212161 A1 | 9/2008 | Valette et al. | |
| 2008/0212942 A1 * | 9/2008 | Gordon .............. | H04N 21/4334 |
| | | | 348/E7.071 |
| 2008/0309649 A1 * | 12/2008 | Kojima ................ | G09G 3/3283 |
| | | | 327/108 |
| 2009/0040580 A1 | 2/2009 | Mukawa | |
| 2009/0196460 A1 * | 8/2009 | Jakobs .................... | G06V 40/19 |
| | | | 382/103 |
| 2011/0234750 A1 * | 9/2011 | Lai .......................... | G03B 37/04 |
| | | | 348/E7.001 |
| 2012/0188467 A1 | 7/2012 | Escuti et al. | |
| 2012/0218481 A1 | 8/2012 | Popovich et al. | |
| 2012/0249957 A1 * | 10/2012 | Shibata ................ | A61B 3/0025 |
| | | | 351/206 |
| 2012/0250980 A1 * | 10/2012 | Gillard .................... | H04N 19/46 |
| | | | 382/173 |
| 2012/0254369 A1 * | 10/2012 | Gillard .............. | H04N 21/4756 |
| | | | 709/219 |
| 2012/0257005 A1 * | 10/2012 | Browne ................ | G02B 27/017 |
| | | | 348/E7.001 |
| 2013/0099700 A1 * | 4/2013 | Kreye .................... | H05B 47/10 |
| | | | 315/320 |
| 2013/0182066 A1 * | 7/2013 | Ishimoto ................. | E02F 9/261 |
| | | | 348/38 |
| 2014/0037213 A1 * | 2/2014 | Niederberger .......... | G06T 11/00 |
| | | | 382/195 |
| 2014/0049452 A1 * | 2/2014 | Maltz .................. | G02B 27/017 |
| | | | 345/8 |
| 2014/0098010 A1 | 4/2014 | Travis | |
| 2014/0300966 A1 | 10/2014 | Travers et al. | |
| 2015/0243718 A1 * | 8/2015 | Kwon .................. | H10K 59/131 |
| | | | 257/43 |
| 2015/0253591 A1 | 9/2015 | Kato et al. | |
| 2016/0029883 A1 * | 2/2016 | Cox ........................ | G06V 40/19 |
| | | | 351/209 |
| 2016/0085300 A1 * | 3/2016 | Robbins ................. | G06F 3/013 |
| | | | 345/633 |
| 2016/0241892 A1 * | 8/2016 | Cole .................... | H04N 13/275 |

(56) References Cited

U.S. PATENT DOCUMENTS

| | | | |
|---|---|---|---|
| 2016/0342205 A1* | 11/2016 | Shigeta | G06V 10/147 |
| 2017/0307886 A1 | 10/2017 | Stenberg et al. | |
| 2018/0046859 A1* | 2/2018 | Jarvenpaa | H04N 23/56 |
| 2018/0073686 A1 | 3/2018 | Quilici et al. | |
| 2018/0081322 A1 | 3/2018 | Robbins et al. | |
| 2018/0143586 A1 | 5/2018 | Narducci et al. | |
| 2018/0196263 A1 | 7/2018 | Vallius et al. | |
| 2018/0232048 A1 | 8/2018 | Popovich et al. | |
| 2018/0237696 A1 | 8/2018 | Tuffin et al. | |
| 2018/0239177 A1 | 8/2018 | Oh | |
| 2018/0275409 A1* | 9/2018 | Gao | H04N 13/332 |
| 2018/0307048 A1* | 10/2018 | Alexander | G03H 1/26 |
| 2018/0364487 A1 | 12/2018 | Yeoh et al. | |
| 2019/0041634 A1 | 2/2019 | Popovich et al. | |
| 2019/0079292 A1 | 3/2019 | Alexander et al. | |
| 2019/0086674 A1* | 3/2019 | Sinay | G06T 19/006 |
| 2019/0094981 A1 | 3/2019 | Bradski et al. | |
| 2019/0147564 A1 | 5/2019 | Yuan et al. | |
| 2019/0243134 A1 | 8/2019 | Perreault et al. | |
| 2019/0310456 A1 | 10/2019 | Meng et al. | |
| 2019/0317450 A1 | 10/2019 | Yaroshchuk et al. | |
| 2019/0361241 A1 | 11/2019 | Amitai | |
| 2020/0041787 A1 | 2/2020 | Popovich et al. | |
| 2020/0043398 A1 | 2/2020 | Salazar | |
| 2020/0081252 A1 | 3/2020 | Jamali et al. | |
| 2020/0116995 A1 | 4/2020 | Chi et al. | |
| 2020/0116996 A1 | 4/2020 | Lee et al. | |
| 2020/0143741 A1* | 5/2020 | Tsuboi | G09G 3/3233 |
| 2020/0159084 A1 | 5/2020 | Choi | |
| 2020/0183159 A1 | 6/2020 | Danziger | |
| 2020/0183174 A1* | 6/2020 | Noui | G06F 3/013 |
| 2020/0271936 A1 | 8/2020 | Leibovici et al. | |
| 2020/0336645 A1* | 10/2020 | Fukuda | H04N 1/00251 |
| 2020/0368616 A1* | 11/2020 | Delamont | A63F 13/65 |
| 2020/0371388 A1 | 11/2020 | Geng et al. | |
| 2020/0412965 A1* | 12/2020 | Yoshida | H04N 23/672 |
| 2021/0011284 A1* | 1/2021 | Andreev | G02B 27/0179 |
| 2021/0041948 A1* | 2/2021 | Berkner-Cieslicki | G06F 3/011 |
| 2021/0055555 A1 | 2/2021 | Chi et al. | |
| 2021/0191122 A1 | 6/2021 | Yaroshchuk et al. | |
| 2021/0199958 A1* | 7/2021 | Huang | G02B 27/0093 |
| 2021/0199970 A1 | 7/2021 | Huang et al. | |
| 2021/0208397 A1 | 7/2021 | Lu et al. | |
| 2021/0209364 A1 | 7/2021 | Park et al. | |
| 2021/0405374 A1 | 12/2021 | Komanduri et al. | |
| 2021/0405380 A1 | 12/2021 | Urness et al. | |
| 2022/0004001 A1 | 1/2022 | Danziger et al. | |
| 2022/0197376 A1* | 6/2022 | Boyle | G02B 27/0093 |
| 2022/0299754 A1 | 9/2022 | Gollier et al. | |
| 2022/0350219 A1 | 11/2022 | Danziger | |
| 2022/0382061 A1 | 12/2022 | Schultz | |
| 2022/0382064 A1* | 12/2022 | Rohn | G02B 1/002 |
| 2022/0394234 A1* | 12/2022 | Etigson | G02B 30/10 |
| 2022/0397956 A1* | 12/2022 | Lundell | G06F 3/013 |
| 2022/0413302 A1* | 12/2022 | Meitav | G06F 3/013 |
| 2022/0413603 A1* | 12/2022 | Held | G02B 27/0093 |
| 2023/0014577 A1 | 1/2023 | Gollier et al. | |
| 2023/0057514 A1* | 2/2023 | Fix | G06T 7/246 |

FOREIGN PATENT DOCUMENTS

| | | |
|---|---|---|
| CN | 115698819 A | 2/2023 |
| EP | 2767852 A1 | 8/2014 |
| GB | 422680 A | 1/1935 |
| GB | 2422680 A | 8/2006 |
| GB | 2585211 A | 1/2021 |
| JP | H0682851 A | 3/1994 |
| KR | 20170094350 A | 8/2017 |
| KR | 20180135646 A | 12/2018 |
| KR | 20210004776 A | 1/2021 |
| WO | 2019178398 A1 | 9/2019 |
| WO | 2021030093 A1 | 2/2021 |
| WO | 2021091622 A1 | 5/2021 |
| WO | 2021242667 A1 | 12/2021 |
| WO | 2022052949 A1 | 3/2022 |

OTHER PUBLICATIONS

Chang A. S. P., "Tunable Liquid Crystal-Resonant Grating Filter Fabricated by Nanoimprint Lithography," IEEE Photonics Technology Letters, vol. 19, No. 19, Oct. 1, 2007, pp. 1457-1459.
International Search Report and Written Opinion for International Application No. PCT/US2022/051388, mailed Apr. 6, 2023, 12 pages.
International Search Report and Written Opinion for International Application No. PCT/US2022/051487, mailed Apr. 11, 2023, 8 pages.
International Search Report and Written Opinion for International Application No. PCT/US2022/051608, mailed Apr. 5, 2023, 11 pages.
International Search Report and Written Opinion for International Application No. PCT/US2022/051751, mailed Apr. 11, 2023, 14 pages.
International Search Report and Written Opinion for International Application No. PCT/US2022/051758, mailed Mar. 22, 2023, 9 pages.
International Search Report and Written Opinion for International Application No. PCT/US2022/051809, mailed Apr. 5, 2023, 10 pages.
Invitation to Pay Additional Fees for International Application No. PCT/US2022/051814, mailed Apr. 11, 2023, 14 pages.
Jolly S., et al., "Near-to-Eye Electroholography via Guided-Wave Acousto-Optics for Augmented Reality," Proceedings of SPIE, vol. 10127, Mar. 2, 2017, 11 pages.
Kollosche M., et al., "Voltage-Controlled Compression for Period Tuning of Optical Surface Relief Gratings," Optics Letters, vol. 36, No. 8, Apr. 15, 2011, pp. 1389-1391.
Lee K. M., et al., "Color-Tunable Mirrors Based on Electrically Regulated Bandwidth Broadening in Polymer-Stabilized Cholesteric Liquid Crystals," ACS Photonics, Sep. 17, 2014, pp. 1033-1041.
Lin I-T., et al., "Electro-Responsive Surfaces with Controllable Wrinkling Patterns for Switchable Light reflection—Diffusion-Grating Devices," Marterials Today, vol. 41, Dec. 2020, 11 pages.
Maimone A., et al., "Holographic Optics for Thin and Lightweight Virtual Reality," Facebook Reality Labs, ACM Trans. Graph. Article 67, vol. 39, No. 4, Jul. 2020, 14 pages.
Shih W-C., et aL, "High-Resolution Electrostatic Analog Tunable Grating With a Single-Mask Fabrication Process," Journal of Microelectromechanical Systems, vol. 15, No. 4, Aug. 2006, pp. 763-769.
Sirleto L., et al., "Electro-Optical Switch and Continuously Tunable Filter based on a Bragg Grating in a Planar Waveguide with a Liquid Crystal Overlayer," Optical Engineering, vol. 41, No. 11, Nov. 2002, pp. 2890-2898.
Xiang J., et al., "Electrically Tunable Selective Reflection of Light from Ultraviolet to Visible and Infrared by Heliconical Cholesterics," Advanced Materials, vol. 27, Issue19, May 20, 2015, 5 pages.
Draper C.T., et al., "Holographic Waveguide Head-Up Display with 2-D Pupil Expansion and Longitudinal Image Magnification," Applied Optics, Feb. 10, 2019, vol. 58, No. 5, pp. A251-A257.
Palto S.P., "Dynamic and Photonic Properties of Field-Induced Gratings in Flexoelectric LC Layers," Crystals, 2021, vol. 11, 894, 13 pages.
Pogue R.T., et al., "Electrically Switchable Bragg Gratings from Liquid Crystal/Polymer Composites," Applied Spectroscopy, 2000, vol. 54, No. 1, pp. 12A-28A.
Smalley D.E., et al., "Status of Leaky Mode of Holography," Photonics, 2021, 8, 292, 22 pages.
Xiang J., et al., "Electrooptic Response of Chiral Nematic Liquid Crystals with Oblique Helicoidal Director," Physical Review Letters, 2014, 112, 217801, 14 pages.
Zhan T., et al., "High-Efficiency Switchable Optical Elements for Advanced Head-Up Displays," Journal of the Society for Information Display, Mar. 21, 2019, vol. 27, No. 4, pp. 1-9.

(56) References Cited

OTHER PUBLICATIONS

International Search Report and Written Opinion for International Application No. PCT/US2023/021926, mailed Sep. 4, 2023, 12 pages.
International Search Report and Written Opinion for International Application No. PCT/US2023/022012, mailed Sep. 1, 2023, 11 pages.
International Search Report and Written Opinion for International Application No. PCT/US2022/051755, mailed Apr. 26, 2023, 9 pages.
International Search Report and Written Opinion for International Application No. PCT/US2022/051781, mailed Apr. 18, 2023, 13 pages.
International Search Report and Written Opinion for International Application No. PCT/US2022/051801 mailed Apr. 14, 2023, 11 pages.
International Search Report and Written Opinion for International Application No. PCT/US2022/051805 mailed Apr. 14, 2023, 10 pages.
International Search Report and Written Opinion for International Application No. PCT/US2022/051814, mailed Jun. 2, 2023, 20 pages.
International Preliminary Report on Patentability for International Application No. PCT/US2022/051388, mailed Jun. 20, 2024, 10 pages.
International Preliminary Report on Patentability for International Application No. PCT/US2022/051487, mailed Jun. 20, 2024, 7 pages.
International Preliminary Report on Patentability for International Application No. PCT/US2022/051608, mailed Jun. 20, 2024, 9 pages.
International Preliminary Report on Patentability for International Application No. PCT/US2022/051755, mailed Jun. 20, 2024, 7 pages.
International Preliminary Report on Patentability for International Application No. PCT/US2022/051758, mailed Jun. 20, 2024, 7 pages.
International Preliminary Report on Patentability for International Application No. PCT/US2022/051781, mailed Jun. 20, 2024, 11 pages.
International Preliminary Report on Patentability for International Application No. PCT/US2022/051801, mailed Jun. 20, 2024, 10 pages.
International Preliminary Report on Patentability for International Application No. PCT/US2022/051805, mailed Jun. 20, 2024, 9 pages.
International Preliminary Report on Patentability for International Application No. PCT/US2022/051814, mailed Jun. 20, 2024, 16 pages.

* cited by examiner

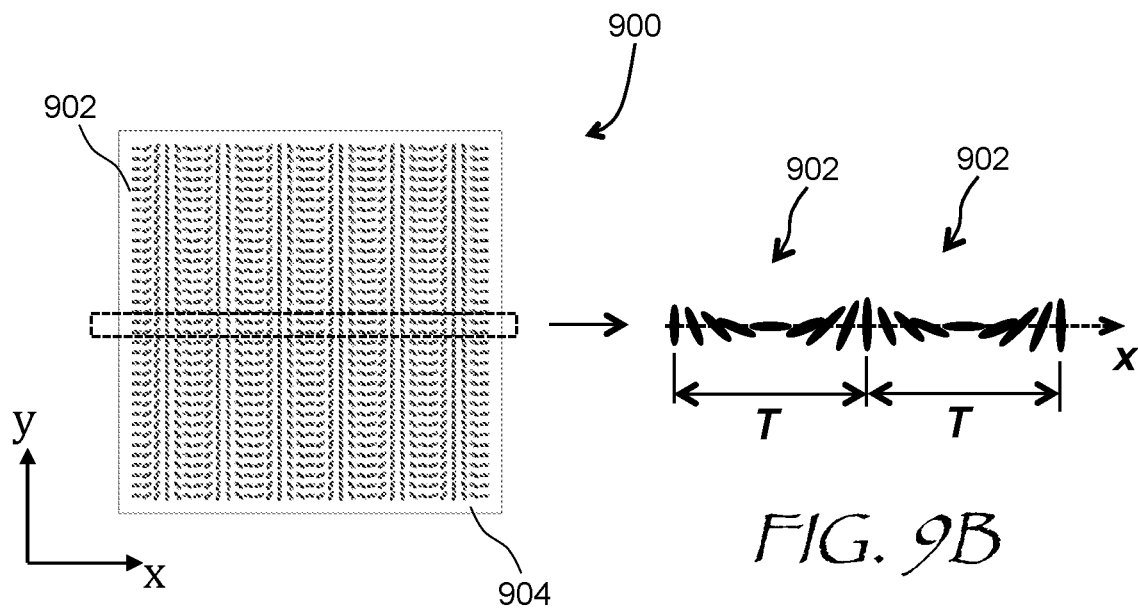
FIG. 9A
FIG. 9B
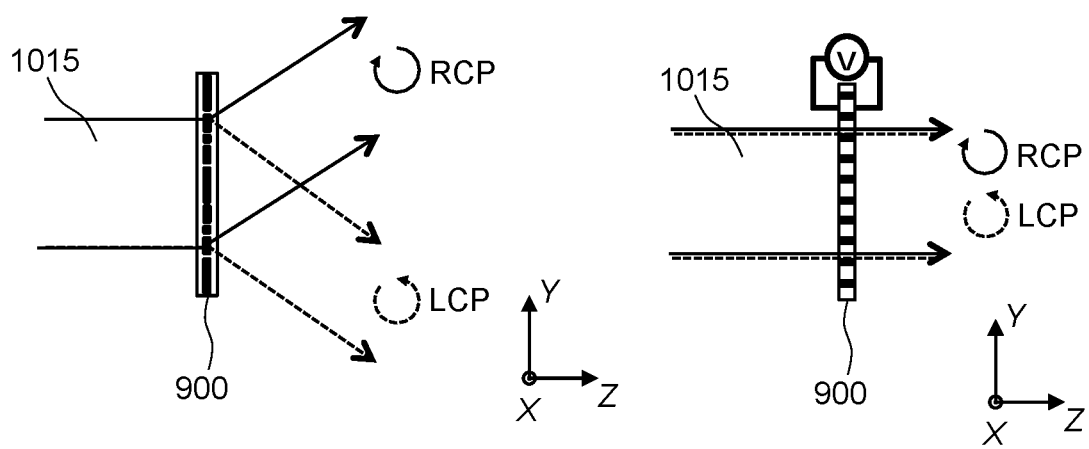
FIG. 10A
FIG. 10B

EYE TRACKING WITH SWITCHABLE GRATINGS

REFERENCE TO RELATED APPLICATION

This application claims priority from U.S. Provisional Patent Application No. 63/286,349 entitled "Active Gratings in Pupil-Replicated Displays and Illuminators", and U.S. Provisional Patent Application No. 63/286,230 entitled "Active Fluidic Optical Element", both filed on Dec. 6, 2021 and incorporated herein by reference in their entireties.

TECHNICAL FIELD

The present disclosure relates to tunable optical devices, and in particular to eye tracking systems usable in visual display systems, as well as components, modules, and methods for eye tracking and visual display systems.

BACKGROUND

Visual displays provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems, such s near-eye displays (NEDs), are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner component including its light routing optics may be transparent to external light.

An NED is usually worn on the head of a user. Consequently, a large, bulky, unbalanced, and heavy display device with a heavy battery would be cumbersome and uncomfortable for the user to wear. Head-mounted display devices can benefit from a compact and efficient configuration, including efficient light sources and illuminators providing illumination of a display panel, high-throughput combiner components and ocular lenses, and other optical elements in the image forming train that can provide an image to a user's eye with minimal image distortions and artifacts.

BRIEF DESCRIPTION OF THE DRAWINGS

Exemplary embodiments will now be described in conjunction with the drawings, in which:

FIG. 9A is a frontal view of an active Pancharatnam-Berry phase (PBP) liquid crystal (LC) grating usable in an eye tracker of this disclosure;

FIG. 9B is a magnified schematic view of LC molecules in an LC layer of the active PBP LC grating of FIG. 9A;

FIGS. 10A and 10B are side schematic views of the active PBP LC grating of FIGS. 9A and 9B, showing light propagation in OFF (FIG. 10A) and ON (FIG. 10B) states of the active PBP LC grating;

DETAILED DESCRIPTION

Figure 1:
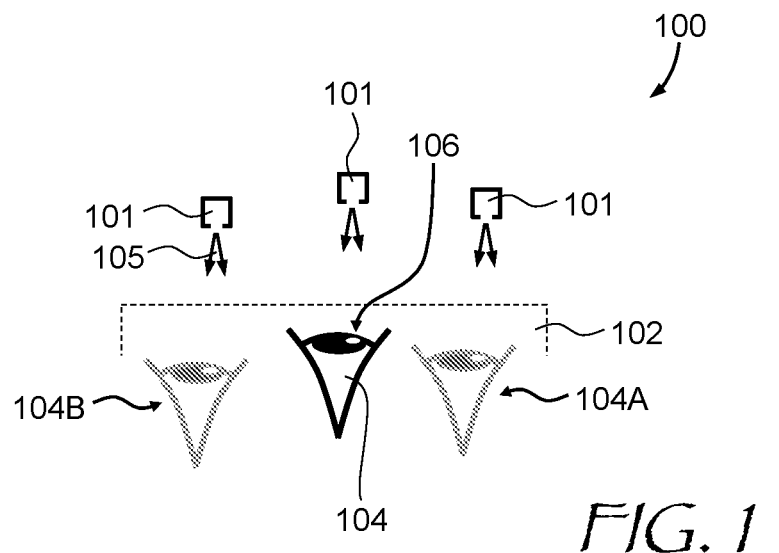
FIG. 1 is a schematic view of an eye illuminator for an eye tracking system, the illuminator including a plurality of illuminating light sources.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. Throughout the specification, the terms "switchable" and "tunable" are used interchangeably.

Near-eye displays use eye trackers to determine viewer's eyes position and orientation. This information is used to adjust the optical system's accommodation distance to account for the eye pupil position, to redirect light towards the pupil for better optical throughput, to adjust the displayed content, etc.

An eye tracking system may include illuminators for illuminating the eye with invisible e.g. infrared light, and an eye tracking camera for obtaining a series of images of the eye illuminated by the illuminators. The illuminators may be disposed all around an eyebox defined as a geometrical area where the user's eye may be located, to provide adequate illumination. The eye tracking illuminators, cameras, and the accompanying redirecting/focusing optics, as well as the display image forming optics need to be arranged in a tight space in front of and around the eye. This may represent a significant technical challenge.

In accordance with this disclosure, switchable grating structures may be used to provide a functional integration of the eye tracking optics into a near-eye display for better compactness, performance, and energy efficiency. In some embodiments, a switchable grating structure may be optically coupled to the light source for receiving and redirecting the illuminating light to a location of the eye at an eyebox, thus greatly reducing the required number of the illuminating light sources. In some embodiments, a switchable grating may be placed in an image forming optical path of an eye tracking system. Time division multiplexing may be used to switch the near-eye display between an image displaying mode and an eye tracking mode. For instance, the eye tracking may be performed in between visual frames provided to the user of the display, enabling a compact and efficient overall display configuration.

In accordance with the present disclosure, there is provided an eye tracking system for determining at least one of a position or orientation of an eye at an eyebox. The eye tracking system includes a light source for providing illuminating light, a switchable grating structure optically coupled to the light source for receiving and redirecting the illuminating light to a location of the eye at an eyebox, and an eye tracking camera configured for obtaining images of the eye at the eyebox.

A controller may be operably coupled to the switchable grating structure and the eye tracking camera and configured to determine the location of the eye at the eyebox from an image obtained by the eye tracking camera, and cause the switchable grating structure to redirect the illuminating light to the location of the eye at the eyebox. The controller may be further configured to determine the orientation of the eye at the eyebox by detecting a glint of the illuminating light in an image obtained by the eye tracking camera. The glint is formed by a reflection of the illuminating light from the eye upon redirecting of the illuminating light to the location of the eye.

In accordance with the present disclosure, there is provided a near-eye display comprising a projector for providing image light carrying an image in angular domain for viewing by an eye at an eyebox, a light source for providing illuminating light for illumination of the eye at the eyebox, and a switchable grating structure optically coupled to the light source for receiving and redirecting the illuminating light to a location of the eye at an eyebox.

The near-eye display may further include an eye tracking camera configured for obtaining images of the eye at the eyebox, and a controller operably coupled to the switchable grating structure and the eye tracking camera and configured to determine the location of the eye at the eyebox from an image obtained by the eye tracking camera, and to cause the switchable grating structure to redirect the illuminating light to the location of the eye at the eyebox. The controller may be further configured to determine orientation of the eye at the eyebox by detecting a glint of the illuminating light in an image obtained by the eye tracking camera; the glint may be formed by a reflection of the illuminating light from the eye upon redirecting of the illuminating light to the location of the eye.

The above mentioned switchable grating structure may include at least one of a switchable polarization volume hologram (PVH) grating, a switchable Pancharatnam-Berry phase (PBP) liquid crystal (LC) grating, a switchable surface relief liquid crystal (LC) grating, or a fluidic grating, for example. In embodiments where the eye tracking system includes an acoustic actuator coupled to a slab of transparent material, the switchable grating structure may be formed by an acoustic wave generated by the acoustic actuator in the slab.

In accordance with the present disclosure, there is further provided a method for determining at least one of a position or orientation of an eye at an eyebox. The method includes providing illuminating light for illuminating the eye at the eyebox, using a switchable grating structure to redirect the illuminating light to a location of the eye at an eyebox, and using an eye tracking camera to obtain an image of the eye at the eyebox. The method may further include determining the location of the eye at the eyebox from the image obtained by the eye tracking camera, and causing the switchable grating structure to redirect the illuminating light to the location of the eye at the eyebox.

The method may further include determining the orientation of the eye at the eyebox by detecting a glint of the illuminating light in an image obtained by the eye tracking camera, wherein the glint is formed by a reflection of the illuminating light from the eye upon redirecting of the illuminating light to the location of the eye. Using the switchable grating structure may include using at least one of: a polarization volume hologram (PVH) grating; a tunable Pancharatnam-Berry phase (PBP) liquid crystal (LC) grating; a tunable liquid crystal (LC) grating; a fluidic grating; or an acoustic wave generated by an acoustic actuator in a slab of transparent material.

Illustrative embodiments having switchable gratings in the eye tracker's eye illumination path will now be considered. Referring to FIG. 1, an eyebox illuminator 100 includes a plurality of light sources 101 illuminating an eyebox 102. The light sources 101 may be e.g. semiconductor light sources such as light-emitting diodes (LEDs) or vertical cavity surface-emitting lasers (VCSELs) emitting illuminating light 105 preferably at a wavelength invisible to an eye 104, for example at a near-infrared wavelength of between 720 nm and 1100 nm, to avoid dazzling or distracting the viewer. The light sources 101 are spread over the entire eyebox 102 to provide illumination of the eye 104 at all possible locations of the eye 104 in the eyebox 102, including e.g. a first location 104A and a second location 104B. Only three such sources are shown for brevity.

The illumination of the eye 104 with a light source 101 may cause a specular reflection or glint 106 of the illuminating light 105 in an image of the eye 104 taken with an eye tracking camera. The location of the glint 106 in an image of the eye 104 relative to the eye pupil may facilitate the determination of orientation, i.e. the direction of gaze, of the eye 104. More than one glint 106 may be relied upon for eye orientation determination, and accordingly more than one light source 101 and/or a multi-emitter light source 101 may need to be provided at each location at the eyebox 102. The overall number of the light sources 101 required to illuminate the entire eyebox 102 may become quite large. This increases costs, complexity, and energy consumption of the eyebox illuminator 100.

Figure 2:
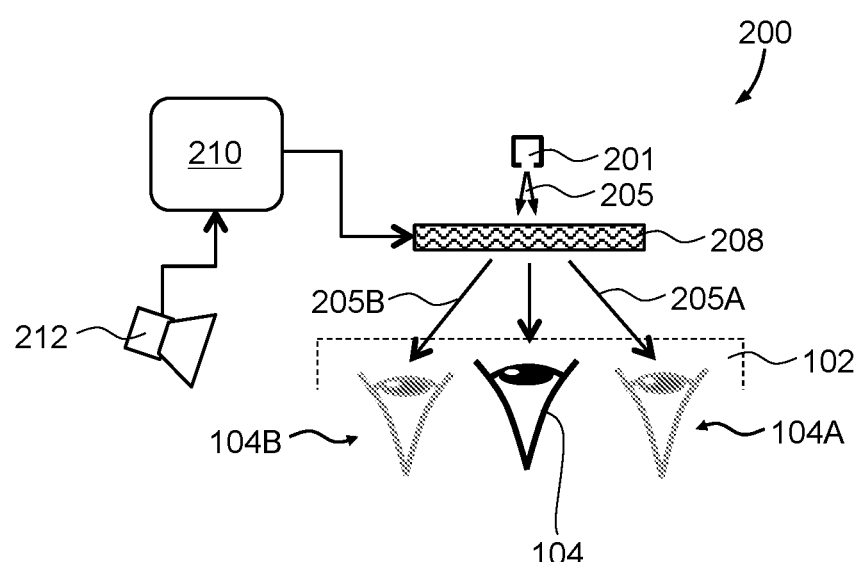
FIG. 2 is a schematic view of an eye tracking system including an illuminating light source coupled to a switchable grating configured to deviate the illuminating light towards an eye location at an eyebox.

Turning to FIG. 2, an eye tracking system 200 includes a light source 201 providing illuminating light 205 such as, for example, an LED, a VCSEL, a multi-emitter semiconductor light source, or another semiconductor light source. The light source 201 may operate in an invisible part of optical spectrum such as near-infrared light in a wavelength range between 720 nm and 1100 nm. A switchable grating structure 208 is optically coupled to the light source 201 for receiving and redirecting the illuminating light 205 to a location of the eye 104 at the eyebox 102. Examples of the switchable grating structure 208 will be provided further below. An eye tracking camera 212 is configured to obtain images of the eye 104 at the eyebox 102.

A controller 210 may be operably coupled to the switchable grating structure 208 and the eye tracking camera 212. The controller 210 may be suitably configured, for example programmed with software, firmware, and/or hard-wired, to determine the location of the eye 104 at the eyebox 102 from an image or a series of images obtained by the eye tracking camera 212. The controller 210 may be configured to cause the switchable grating structure 208 to redirect the illuminating light 205 to the location of the eye 104 at the eyebox 102. For example, when the controller 210 analyzes images obtained by the eye tracking camera 212 and determines that the eye 104 is at the first location 104A, the controller 210 may cause the switchable grating structure 208 to redirect the illuminating light 205 in a first direction 205A towards the first location 104A. When the controller 210 determines that the eye 104 is at the second location 104B, the controller 210 may cause the switchable grating structure 208 to redirect the illuminating light 205 in a second direction 205B towards the second location 104B.

The eye tracking system 200 may be used in a near-eye display to determine at least one if a position or orientation of a user's eye at the eyebox of the display. Referring for a non-limiting illustrative example to FIG. 3, a near-eye display 300 includes a projector 352 for providing image light 321 carrying an image in angular domain for viewing by the eye 104 at the eyebox 102. Herein, the term "image in angular domain" means an image where different elements of the image (i.e. pixels of the image) are represented by angles of corresponding rays of the converging image light beam 115, the rays carrying optical power levels and/or color composition corresponding to brightness and/or color values of the image pixels. In the implementation shown, the projector 352 includes a microdisplay panel 354 coupled to a collimator 356, e.g. a lens, for converting an image in linear domain displayed by the microdisplay panel into the image in angular domain. A scanning projector may be used in place of the microdisplay-based projector 352. A scanning projector may scan or raster an image in angular domain pixel by pixel, or in groups of pixels.

The near-eye display 300 may further include a pupil-replicating lightguide 308, which carries the image light 321 generated by the microdisplay 354 to the eyebox 102 by propagating the image light 321 inside the pupil-replicating lightguide 308 by a series of internal reflections, delivering laterally offset portions 321A of the image light 321 to the eyebox 102. The image in angular domain may be directly viewed by the eye 104. The pupil-replicating lightguide 308 may include a grating in-coupler 314 and a grating out-coupler 316. The grating in-coupler 314 in-couples the image light 321 into the pupil-replicating lightguide 308, and the grating out-coupler out-couples the portions 321A of the image light 321 from the pupil-replicating lightguide 308.

The near-eye display 300 includes the eye tracking system 200 of FIG. 2. The light source 201 of the eye tracking system 200 provides the illuminating light 205 for illumination of the eye 104 at the eyebox 102 through the pupil-replicating lightguide 308, which is substantially transparent to the illuminating light 205. The switchable grating structure 208 is optically coupled to the light source 201 for receiving and redirecting the illuminating light 205 to a location of the eye 104 at the eyebox 102.

The location of the eye 104 at the eyebox 102 may be determined by the eye tracking camera 212 coupled to a controller 310, which is analogous to the controller 210 of the eye tracking system 200 of FIG. 2, further providing other functions related to operation of the near-eye display 300. The controller 310 may determine the location of the eye 104 at the eyebox 102 from an image obtained by the eye tracking camera 212, and cause the switchable grating structure 208 to redirect the illuminating light 205 to the location of the eye 104 at the eyebox 102, e.g. to the first location 104A or the second location 104B. The controller 310 may be further configured to determine the orientation of the eye 104 at the eyebox 102 by detecting a glint 206 of the illuminating light 205 in an image obtained by the eye tracking camera. The glint 206 may be formed by a reflection of the illuminating light 205 from the eye 104 upon redirecting of the illuminating light 205 to the location of the eye 104.

Figure 3:
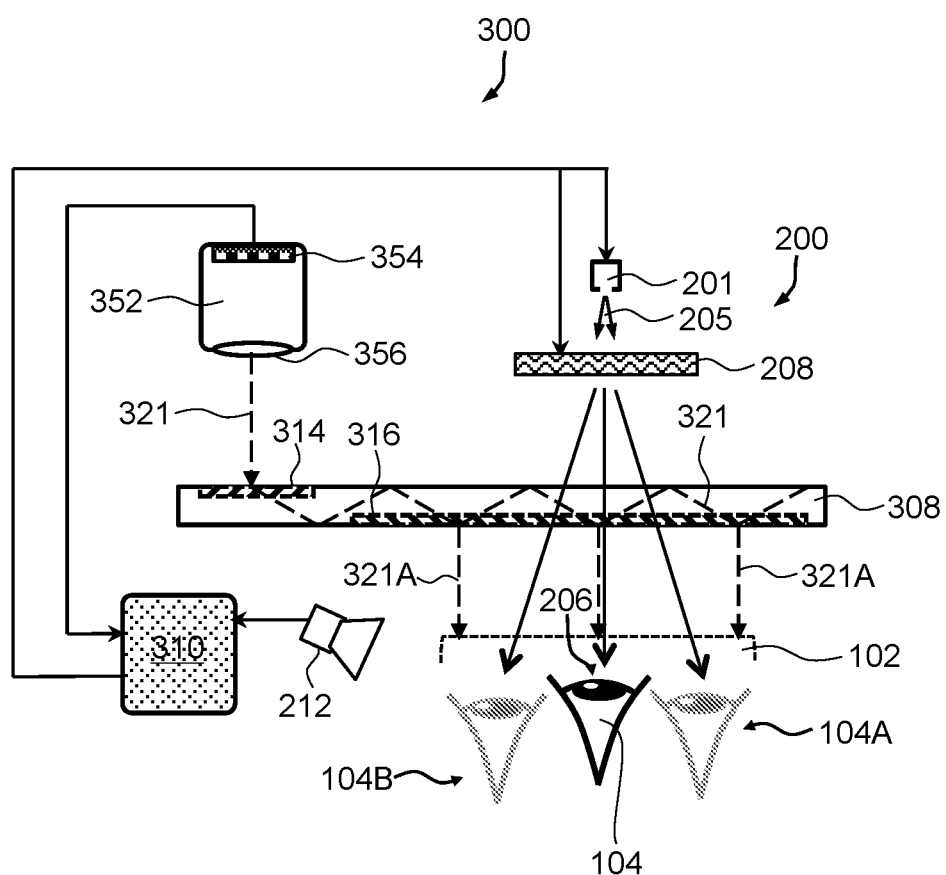
FIG. 3 is a schematic view of a display apparatus using the eye illuminator of FIG. 2.
Figure 4:
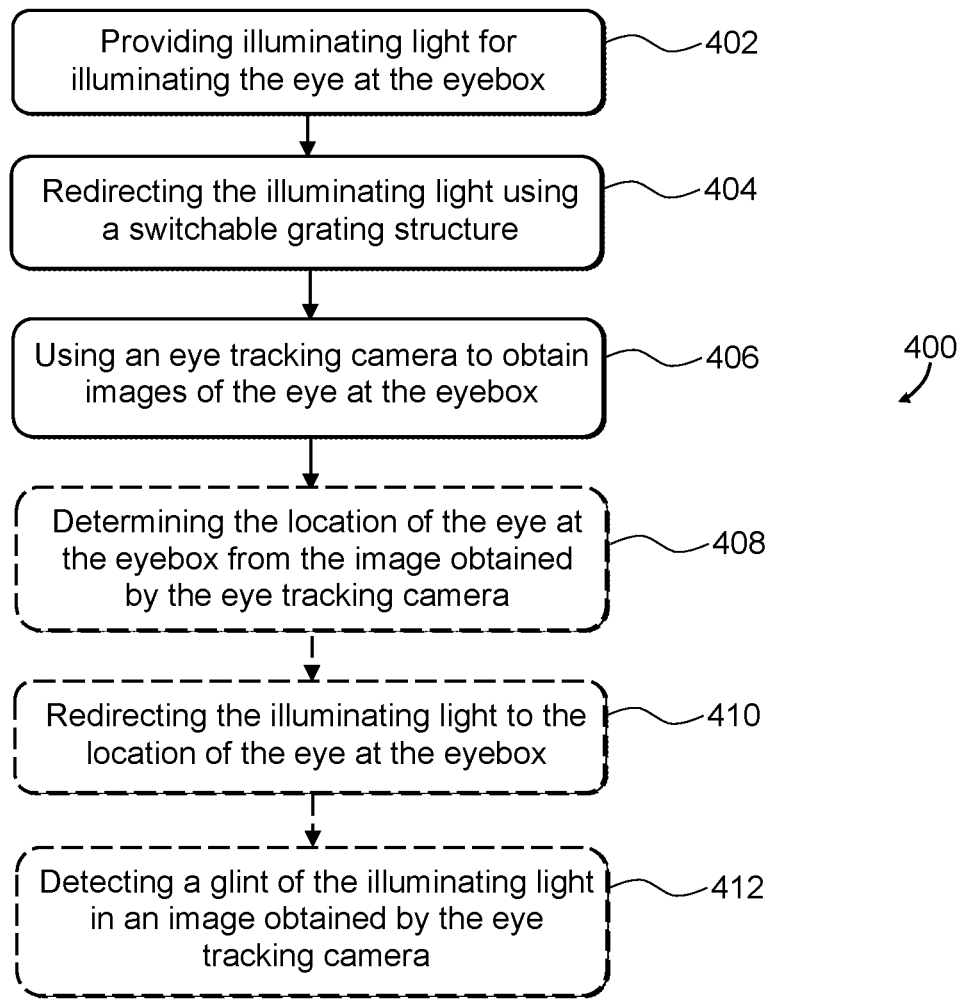
FIG. 4 is a flow chart of a method for tracking an eye at the eyebox.

Turning now to FIG. 4 with further reference to FIG. 3, a method 400 for locating an eye at an eyebox, e.g. determining at least one of a position or orientation of the eye 104 at the eyebox 102 (FIG. 3), includes providing (FIG. 4; 402) illuminating light for illuminating the eye at the eyebox, e.g. using the light source 201 of FIG. 3 to provide the illuminating light 205. A switchable grating structure such as, for example, the switchable grating structure 208 of the near-eye display 300 of FIG. 3 and of the eye tracking system 200 of FIG. 2, is used (FIG. 4; 404) to redirect the illuminating light to a location of the eye at an eyebox. An eye tracking camera is used (406) to obtain an image of the eye at the eyebox.

The method 400 may further include determining (408) the location of the eye at the eyebox from the image obtained by the eye tracking camera e.g. by using suitable calibration and eye image recognition; and causing the switchable grating structure to redirect (410) the illuminating light to the location of the eye at the eyebox. The orientation of the eye at the eyebox may then be determined by detecting (412) a glint of the illuminating light in an image obtained by the eye tracking camera. The glint may be formed by a reflection of the illuminating light from the eye upon redirecting of the illuminating light to the location of the eye.

Figure 5:
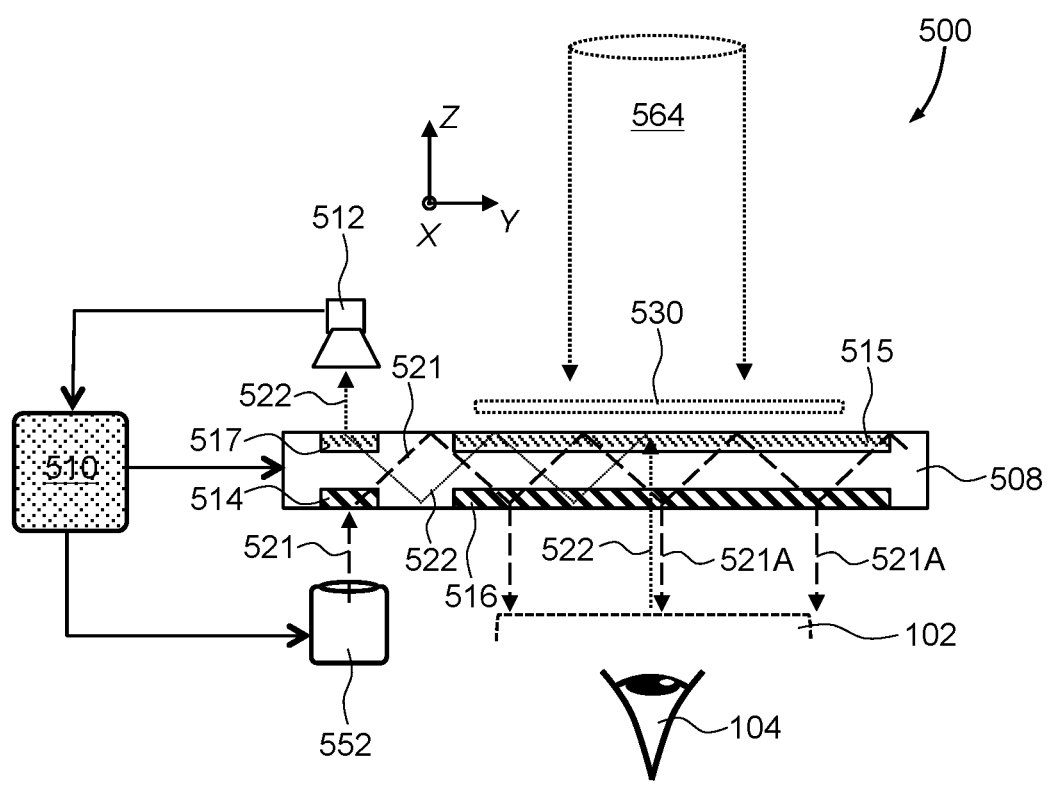
FIG. 5 is a side cross-sectional view of a near-eye display with switchable out-coupling and tracking gratings.

Embodiments illustrating the usage of switchable gratings in an eye tracker's eye image forming paths will now be considered. Referring to FIG. 5 for a non-limiting illustrative example, a near-eye display 500 includes a lightguide, e.g. a pupil-replicating lightguide 508 in form of a slab of transparent material for propagating image light 521 and tracking light 522 by a series of internal reflections in the slab.

The image light 521 carries an image in angular domain to the user's eye 104 at the eyebox 102. The image light 521 may be formed by an image projector 552, which is similar to the image projector 352 of the near-eye display 300 of FIG. 3. To in-couple the image light 521, the pupil-replicating lightguide 500 may include an in-coupler 514, e.g. an in-coupling grating which may be a switchable grating, for in-coupling the image light 521 into the pupil-replicating lightguide 508. To out-couple the image light 521, the pupil-replicating lightguide 500 may include a switchable out-coupling grating 516. The switchable out-coupling grating 516 out-couples portions 521A of the image light 521 to propagate towards the eyebox 102.

The tracking light 522 carries an image of the eye to an eye tracking camera 512. The tracking light 522 is a light reflected from the eye 104 upon illumination by the illumination light 205, or light from a dedicated wide-field illuminator at a suitable wavelength. The pupil-replicating lightguide 508 may include a switchable tracking grating 515 for redirecting the tracking light to propagate in the pupil-replicating lightguide 508 toward the eye tracking camera 512, and an out-coupler 517, e.g. an out-coupling tracking grating which may also be a switchable grating, for out-coupling the tracking light 522 from the pupil-replicating lightguide 508 into the tracking camera 512.

The pupil-replicating lightguide 508 has a clear aperture 530, defined as an area of the pupil-replicating lightguide 508 (i.e. the area in XY plane in FIG. 5) through which external light 564 may propagate to the eye 104, such that the user's eye 104 may observe outside environment. Both the switchable out-coupling grating 516 and the switchable tracking grating 515 are at least partially disposed in the field of view of the outside environment through the clear aperture 530, such that projections of the switchable out-coupling grating 516 and the switchable tracking grating 515 onto the clear aperture 530 of the pupil-replicating lightguide at least partially overlap one another. The switchable out-coupling grating 516 and the switchable tracking grating 515 may be switched to a state where they are transparent or translucent to the external light 564. Alternatively, these gratings may always be transparent or translucent to the external light 564.

The switchable out-coupling grating 516 is switchable between a high-efficiency state, in which an out-coupling efficiency of the switchable out-coupling grating 516 is above a first threshold, and a low-efficiency state, in which an out-coupling efficiency of the switchable out-coupling grating 516 below a second threshold. The first threshold may be e.g. at least 10 times higher than the second threshold, or in some embodiments at least 100 times or at least 300 times higher. Similarly, the switchable tracking grating 515 is switchable between a high-efficiency state, in which an out-coupling efficiency of the switchable out-coupling grating 515 is above a third threshold, and a low-efficiency state, in which an out-coupling efficiency of the switchable tracking grating 515 is below a fourth threshold. The third threshold may be e.g. at least 10 times higher than the fourth threshold, or in some embodiments at least 100 times or at least 300 times higher.

Figure 6:
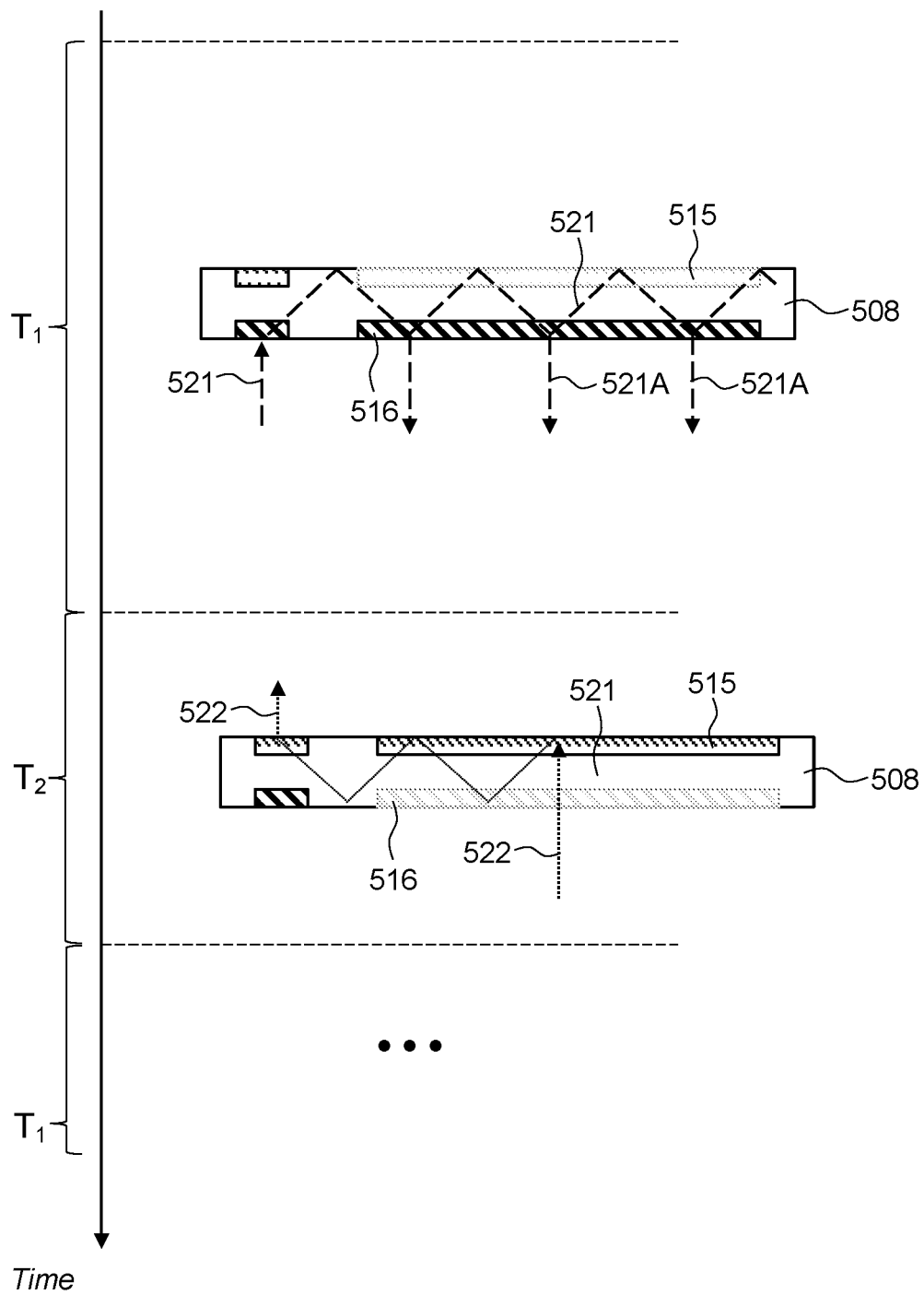
FIG. 6 is a sequence diagram illustrating the operation of the display device of FIG. 5.

A controller 510 may be operably coupled to the switchable out-coupling grating 516, the switchable tracking grating 515, the image projector 552, and the eye tracking camera 512. Referring to FIG. 6 with further reference to FIG. 5, the controller 510 may be suitably configured, for example programmed with software, firmware, and/or hardwired, to switch the switchable out-coupling grating 516 to the high-efficiency state and switch the switchable tracking grating 515 to the low-efficiency state during a first time interval $T_1$. During a subsequent second time interval $T_2$, the controller 510 switches the switchable out-coupling grating 516 to the low-efficiency state and the switchable tracking grating 515 to the high-efficiency state. The second time interval $T_2$ may immediately follow the first time interval $T_1$. The next first time interval $T_1$ may immediately follow the second time interval $T_2$, and so on. The second time interval $T_2$, i.e. the time interval when the eye images are obtained, may be much shorter than the first time interval $T_1$, e.g. at least 10 times shorter, at least 100 times shorter, or even at least 300 times shorter.

Providing separate time slots for the image displaying and for the eye tracking functions allows one to lower the energy consumption of the display 500, with the image displaying and eye tracking being performed in a time-sequential manner. For instance, the first time interval $T_1$ may correspond to an image frame displaying time, and the second time interval $T_2$ may correspond to an inter-frame time interval when a new image frame is being loaded into the display's memory. The controller 510 may be configured to cause the image projector 552 to display the image during the first time interval $T_1$ and to provide no image light 521 during the second time interval $T_2$, i.e. to switch off the image projector 552 during the second time interval $T_2$ to preserve power. During the second time interval $T_2$, the controller 510 may cause the eye tracking camera 512 to obtain the image of the eye 104. The controller 510 may switch the eye illuminating light off during the first time interval $T_1$ to preserve power.

Figure 7:
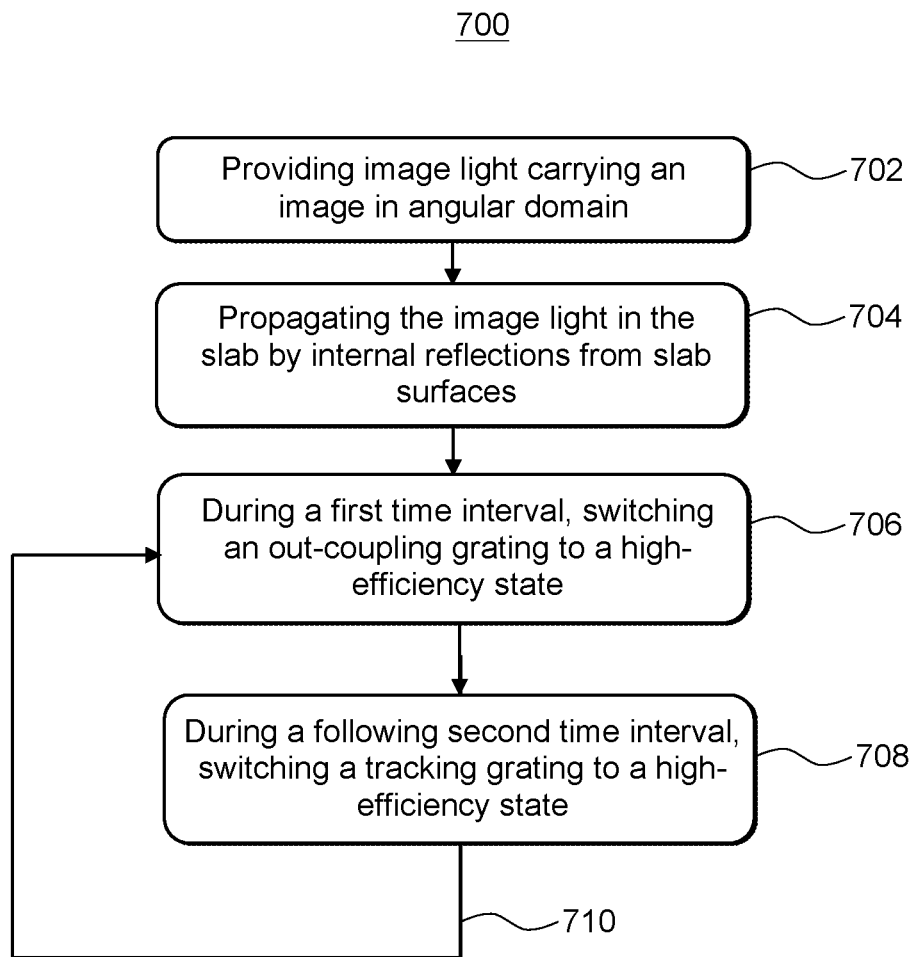
FIG. 7 is a flow chart of a method for displaying an image to an eye and tracking the eye.

Turning to FIG. 7 with further reference to FIGS. 5 and 6, a method 700 for displaying an image to an eye and tracking the eye includes providing (702) image light carrying an image in angular domain, e.g. using the image projector 552 of FIG. 5 to display the image in angular domain. The image may be provided frame by frame, or may be scanned or rastered pixel by pixel, or by groups of pixels, during a frame period. The image light 521 is propagated (704) in a slab of transparent material, e.g. in the pupil-replicating lightguide 508, by series of internal reflections, e.g. total internal reflections, from the slab surfaces. During a first time interval, which may be equal to the frame period as noted above, an out-coupling grating e.g. the out-coupling grating 516 of the pupil-replicating lightguide 508 (FIG. 5) may be switched to a high-efficiency state (706) to out-couple portions of the image light to propagate towards the eyebox. During a second, subsequent time interval which may be equal to an inter-frame period, a tracking grating may be switched (708) to a high-efficiency state to redirect tracking light carrying an image of the eye towards an eye tracking camera. During this time interval, the out-coupling grating may be switched to a low-efficiency state; and similarly, the tracking grating may be switched to a low-efficiency state during the first time interval. The first and second time intervals may then repeat one after another as indicated by an arrow 710. The out-coupling efficiency of the out-coupling grating may be at least ten times higher in the high efficiency state than in the low-efficiency state, and an out-coupling efficiency of the tracking grating may be at least ten times higher in the high efficiency state than in the low-efficiency state.

Figure 8:
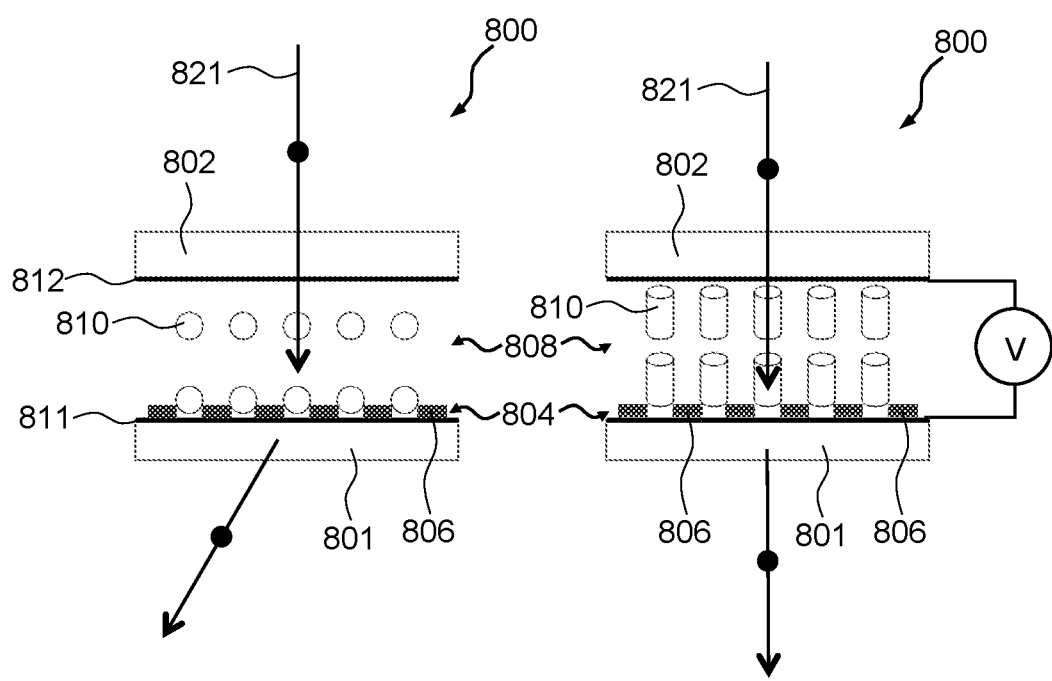
FIG. 8 shows side cross-sectional views of a tunable liquid crystal (LC) surface-relief grating of this disclosure.

Non-limiting examples of switchable/tunable gratings usable in lightguides and displays of this disclosure will now be presented. Referring first to FIG. 8, a tunable liquid crystal (LC) surface-relief grating 800 may be used e.g. in the switchable grating structure 208 of the eye tracking system 200 of FIG. 2, the switchable tracking grating 515, the switchable out-coupling grating 516, the in-coupler 514, and/or the out-coupler 517 of the pupil-replicating lightguide 508 of FIGS. 5 and 6. The tunable LC surface-relief grating 800 includes a first substrate 801 supporting a first conductive layer 811 and a surface-relief grating structure 804 having a plurality of ridges 806 extending from the first substrate 801 and/or the first conductive layer 811.

A second substrate 802 is spaced apart from the first substrate 801. The second substrate 802 supports a second conductive layer 812. A cell is formed by the first 811 and second 812 conductive layers. The cell is filled with a LC fluid, forming an LC layer 808. The LC layer 808 includes nematic LC molecules 810, which may be oriented by an electric field across the LC layer 808. The electric field may be provided by applying a voltage V to the first 811 and second 812 conductive layers.

The surface-relief grating structure 804 may be formed from a polymer with an isotropic refractive index $n_p$ of about 1.5, for example. The LC fluid has an anisotropic refractive index. For light polarization parallel to a director of the LC fluid, i.e. to the direction of orientation of the nematic LC molecules 810, the LC fluid has an extraordinary refractive index $n_e$, which may be higher than an ordinary refractive index $n_o$ of the LC fluid for light polarization perpendicular to the director. For example, the extraordinary refractive index $n_e$ may be about 1.7, and the ordinary refractive index $n_o$ may be about 1.5, i.e. matched to the refractive index $n_p$ of the surface-relief grating structure 804.

When the voltage V is not applied (left side of FIG. 8), the LC molecules 810 are aligned approximately parallel to the grooves of the surface-relief grating structure 804. At this configuration, a linearly polarized light beam 821 with e-vector oriented along the grooves of the surface-relief grating structure 804 will undergo diffraction, since the surface-relief grating structure 804 will have a non-zero refractive index contrast. When the voltage V is applied (right side of FIG. 8), the LC molecules 810 are aligned approximately perpendicular to the grooves of the surface-relief grating structure 804. At this configuration, a linearly polarized light beam 821 with e-vector oriented along the grooves of the surface-relief grating structure 804 will not undergo diffraction because the surface-relief grating structure 804 will appear to be index-matched and, accordingly, will have a substantially zero refractive index contrast. For the linearly polarized light beam 821 with e-vector oriented perpendicular to the grooves of the surface-relief grating structure 804, no diffraction will occur in either case (i.e. when the voltage is applied and when it is not), because at this polarization of the linearly polarized light beam 821, the surface-relief grating structure 804 are index-matched. Thus, the tunable LC surface-relief grating 800 can be switched on and off (for polarized light) by controlling the voltage across the LC layer 808. Several such gratings with differing pitch/slant angle/refractive index contrast may be used to switch between several grating configurations. In some embodiments, the surface-relief grating structure 804 may include a birefringent material, as well.

Referring now to FIG. 9A, a Pancharatnam-Berry phase (PBP) LC switchable grating 900 may be used e.g. in the switchable grating structure 208 of the eye tracking system 200 of FIG. 2, the switchable tracking grating 515, the switchable out-coupling grating 516, the in-coupler 514, and/or the out-coupler 517 of the pupil-replicating lightguide 508 of FIGS. 5 and 6. The PBP LC switchable grating 900 of FIG. 9A includes LC molecules 902 in an LC layer 904. The LC molecules 902 are disposed in XY plane at a varying in-plane orientation depending on the X coordinate. The orientation angle $\phi(x)$ of the LC molecules 902 in the PBP LC switchable grating 900 is given by $$\phi(x) = \pi x/T = \pi x \sin \theta / \lambda_o \quad (1)$$

where $\lambda_o$ is the wavelength of impinging light, T is a pitch of the PBP LC switchable grating 900, and $\theta$ is a diffraction angle given by $$\theta = \sin^{-1}(\lambda_o/T) \quad (2)$$

The azimuthal angle $\phi$ varies continuously across the surface of an LC layer 904 parallel to XY plane as illustrated in FIG. 9B. The variation has a constant period equal to T. The optical phase delay P in the PBP LC grating 900 of FIG. 9A is due to the PBP effect, which manifests $P(x) = 2\phi(x)$ when the optical retardation R of the LC layer 904 is equal to $\lambda_o/2$.

FIGS. 10A and 10B illustrate the operation of the PBP LC switchable grating 900 of FIG. 9A. The PBP LC switchable grating 900 includes the LC layer 904 (FIG. 9A) disposed between parallel substrates configured for applying an electric field across the LC layer 904. The LC molecules 902 are oriented substantially parallel to the substrates in absence of the electric field, and substantially perpendicular to the substrates in presence of the electric field.

In FIG. 10A, the PBP LC switchable grating 900 is in OFF state, such that its LC molecules 902 (FIGS. 9A, 9B) are disposed predominantly parallel to the substrate plane, that is, parallel to XY plane in FIG. 10A. When an incoming light beam 1015 is left-circular polarized (LCP), the PBP LC switchable grating 900 redirects the light beam 1015 upwards by a pre-determined non-zero angle, and the beam 1015 becomes right-circular polarized (RCP). The RCP deflected beam 1015 is shown with solid lines. When the incoming light beam 1015 is right-circular polarized (RCP), the PBP LC switchable grating 900 redirects the beam 1015 downwards by a pre-determined non-zero angle, and the beam 1015 becomes left-circular polarized (LCP). The LCP deflected beam 1015 is shown with dashed lines. Applying a voltage V to the PBP LC switchable grating 900 reorients the LC molecules along Z-axis, i.e. perpendicular to the substrate plane as shown in FIG. 10B. At this orientation of the LC molecules 902, the PBP structure is erased, and the light beam 1015 retains its original direction, whether it is LCP or RCP. Thus, the active PBP LC grating 900 is a tunable grating, i.e. it has a variable beam steering property. Furthermore, the operation of the active PBP LC grating 900 may be controlled by controlling the polarization state of the impinging light beam 1015.

Figure 11A:
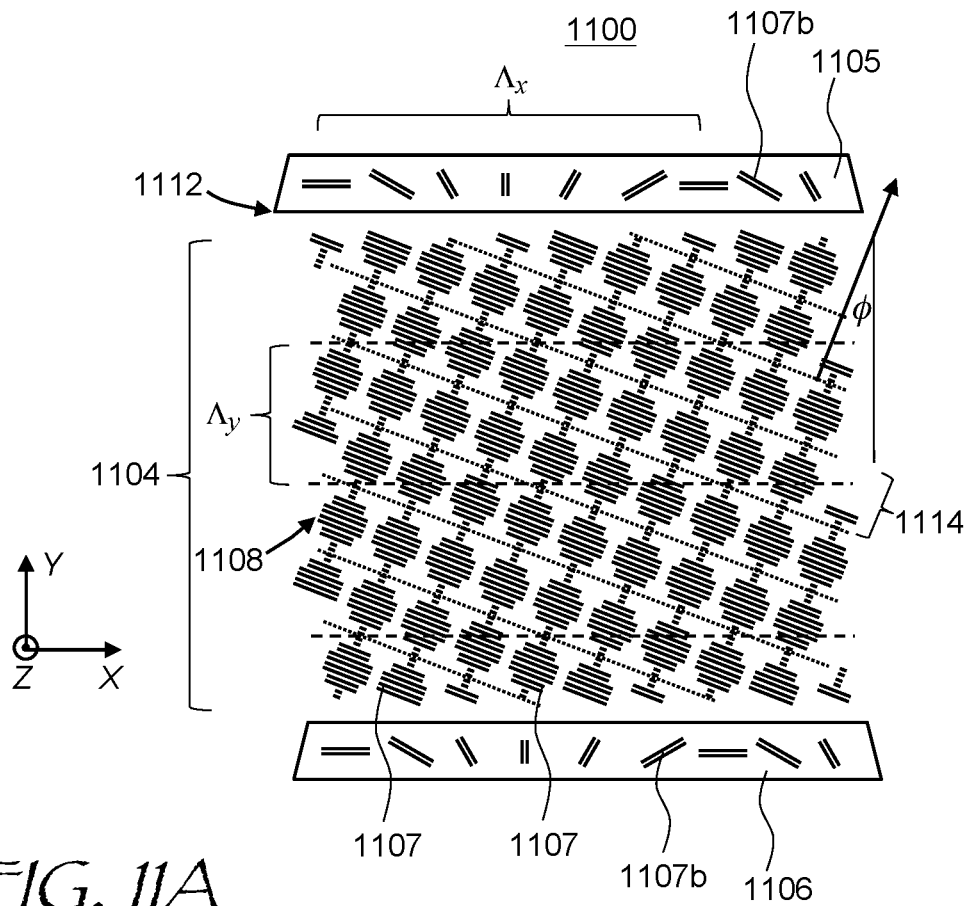
FIG. 11A is a side cross-sectional view of a switchable polarization volume grating (PVH) usable in an eye tracker of this disclosure.

Turning to FIG. 11A, a polarization volume hologram (PVH) grating 1100 may be used e.g. in the switchable grating structure 208 of the eye tracking system 200 of FIG. 2, the switchable tracking grating 515, the switchable out-coupling grating 516, the in-coupler 514, and/or the out-coupler 517 of the pupil-replicating lightguide 508 of FIGS. 5 and 6. The PVH grating 1100 of FIG. 11A includes an LC layer 1104 bound by opposed top 1105 and bottom 1106 parallel surfaces. The LC layer 1104 may include an LC fluid containing rod-like LC molecules 1107 with positive dielectric anisotropy, i.e. nematic LC molecules. A chiral dopant may be added to the LC fluid, causing the LC molecules in the LC fluid to self-organize into a periodic helical configuration including helical structures 1108 extending between the top 1105 and bottom 1106 parallel surfaces of the LC layer 1104. Such a configuration of the LC molecules 1107, termed herein a cholesteric configuration, includes a plurality of helical periods p, e.g. at least two, at least five, at least ten, at least twenty, or at least fifty helical periods p between the top 1105 and bottom 1106 parallel surfaces of the LC layer 1104.

Boundary LC molecules 1107b at the top surface 1105 of the LC layer 1104 may be oriented at an angle to the top surface 1105. The boundary LC molecules 1107b may have a spatially varying azimuthal angle, e.g. linearly varying along X-axis parallel to the top surface 1105, as shown in FIG. 11A. To that end, an alignment layer 1112 may be provided at the top surface 1105 of the LC layer 1104. The alignment layer 1112 may be configured to provide the desired orientation pattern of the boundary LC molecules 1107b, such as the linear dependence of the azimuthal angle on the X-coordinate. A pattern of spatially varying polarization directions of the UV light may be selected to match a desired orientation pattern of the boundary LC molecules 1107b at the top surface 1105 and/or the bottom surface 1106 of the LC layer 1104. When the alignment layer 1112 is coated with the cholesteric LC fluid, the boundary LC molecules 1107b are oriented along the photopolymerized chains of the alignment layer 1112, thus adopting the desired surface orientation pattern. Adjacent LC molecules adopt helical patterns extending from the top 1105 to the bottom 1106 surfaces of the LC layer 1104, as shown.

The boundary LC molecules 1107b define relative phases of the helical structures 1108 having the helical period p. The helical structures 1108 form a volume grating comprising helical fringes 1114 tilted at an angle φ, as shown in FIG. 11A. The steepness of the tilt angle φ depends on the rate of variation of the azimuthal angle of the boundary LC molecules 1107b at the top surface 1105 and p. Thus, the tilt angle φ is determined by the surface alignment pattern of the boundary LC molecules 1107b at the alignment layer 1112. The volume grating has a period $\Lambda_x$ along X-axis and $\Lambda_y$ along Y-axis. In some embodiments, the periodic helical structures 1108 of the LC molecules 1107 may be polymer-stabilized by mixing in a stabilizing polymer into the LC fluid, and curing (polymerizing) the stabilizing polymer.

Figure 11B:
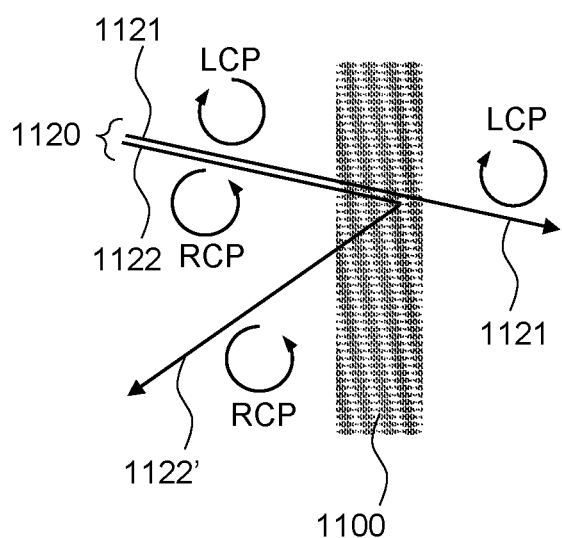
FIG. 11B is a diagram illustrating optical performance of the PVH of FIG. 11A.

The helical nature of the fringes 1114 of the volume grating makes the PVH grating 1100 preferably responsive to light of polarization having one particular handedness, e.g. left- or right-circular polarization, while being substantially non-responsive to light of the opposite handedness of polarization. Thus, the helical fringes 1114 make the PVH grating 1100 polarization-selective, causing the PVH grating 1100 to diffract light of only one handedness of circular polarization. This is illustrated in FIG. 11B, which shows a light beam 1120 impinging onto the PVH grating 1100. The light beam 1120 includes a left circular polarized (LCP) beam component 1121 and a right circular polarized (RCP) beam component 1122. The LCP beam component 1121 propagates through the PVH grating 1100 substantially without diffraction. Herein, the term "substantially without diffraction" means that, even though an insignificant portion of the beam (the LCP beam component 1121 in this case) might diffract, the portion of the diffracted light energy is so small that it does not impact the intended performance of the PVH grating 1100. The RCP beam component 1122 of the light beam 1120 undergoes diffraction, producing a diffracted beam 1122'. The polarization selectivity of the PVH grating 1100 results from the effective refractive index of the grating being dependent on the relationship between the handedness, or chirality, of the impinging light beam and the handedness, or chirality, of the grating fringes 1114. Changing the handedness of the impinging light may be used to switch the performance of the PVH grating 1100. The PVH grating 1100 may also be made switchable or tunable (both terms are used interchangeably in this specification) by applying voltage to the LC layer 1104, which distorts or erases the above-described helical structure. It is further noted that sensitivity of the PVH 1100 to right circular polarized light in particular is only meant as an illustrative example. When the handedness of the helical fringes 1114 is reversed, the PVH 1100 may be made sensitive to left circular polarized light. Thus, the operation of the PVH 1100 may be controlled by controlling the polarization state of the impinging light beam 1120. Furthermore, in some embodiments the PVH 1100 may be made tunable by application of electric field across the LC layer 1104, which erases the periodic helical structures 1108.

Figure 12A:
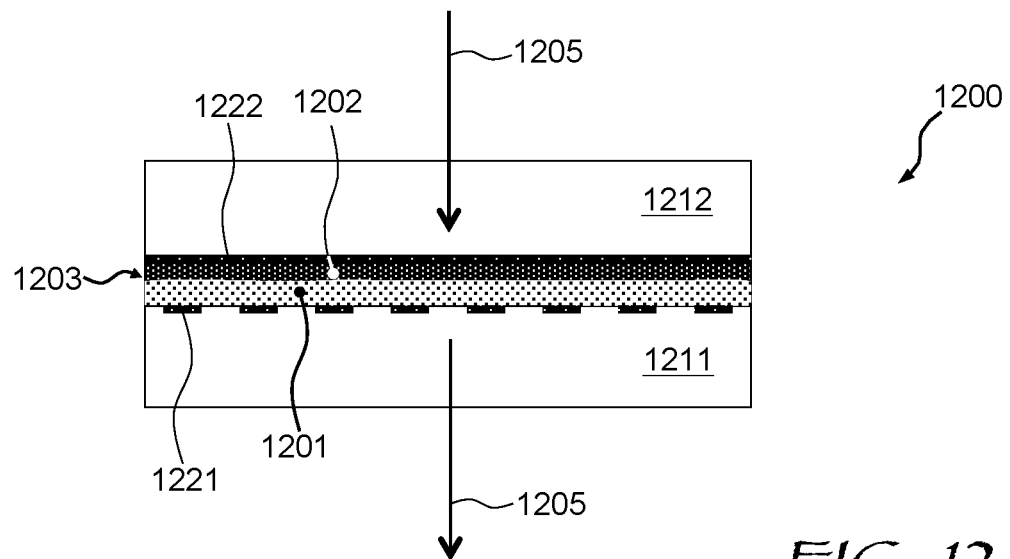
FIG. 12A is a side cross-sectional view of a fluidic grating usable in an eye tracker of this disclosure, in an OFF state.
Figure 12B:
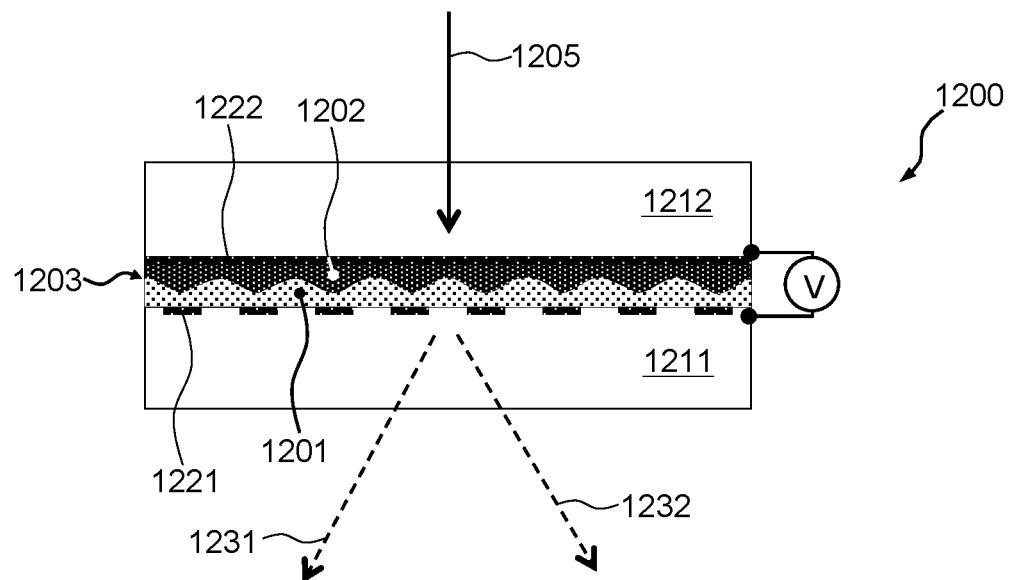
FIG. 12B is a side cross-sectional view of the fluidic grating of FIG. 12A in an ON state.

Referring now to FIGS. 12A and 12B, a fluidic grating 1200 may be used e.g. in the switchable grating structure 208 of the eye tracking system 200 of FIG. 2, the switchable tracking grating 515, the switchable out-coupling grating 516, the in-coupler 514, and/or the out-coupler 517 of the pupil-replicating lightguide 508 of FIGS. 5 and 6. The fluidic grating 1200 includes first 1201 and second 1202 immiscible fluids separated by an inter-fluid boundary 1203. One of the fluids may be a hydrophobic fluid such as oil, e.g. silicone oil, while the other fluid may be water-based. One of the first 1201 and second 1202 fluids may be a gas in some embodiments. The first 1201 and second 1202 fluids may be contained in a cell formed by first 1211 and second 1212 substrates supporting first 1221 and second 1222 electrode structures. The first 1221 and/or second 1222 electrode structures may be at least partially transparent, absorptive, and/or reflective.

At least one of the first 1221 and second 1222 electrode structures may be patterned for imposing a spatially variant electric field onto the 1201 and second 1202 fluids. For example, in 12A and 12B, the first electrode 1221 is patterned, and the second electrodes 1222 is not patterned, i.e. the second electrodes 1222 is a backplane electrode. In the embodiment shown, both the first 1221 and second 1222 electrodes are substantially transparent. For example, the first 1221 and second 1222 electrodes may be indium tin oxide (ITO) electrodes. The individual portions of a patterned electrode may be individually addressable. In some embodiments, the patterned electrode 1221 may be replaced with a continuous, non-patterned electrode coupled to a patterned dielectric layer for creating a spatially non-uniform electric field across the first 1201 and second 1202 fluids.

FIG. 12A shows the fluidic grating 1200 in a non-driven state when no electric field is applied across the inter-fluid boundary 1203. When no electric field is present, the inter-fluid boundary 1203 is straight and smooth; accordingly, a light beam 1205 impinging onto the fluidic grating 1200 does not diffract, propagating right through as illustrated. FIG. 12B shows the fluidic grating 1200 in a driven state when a voltage V is applied between the first 1221 and second 1222 electrodes, producing a spatially variant electric field across the first 1201 and second 1202 fluids separated by the inter-fluid boundary 1203. The application of the spatially variant electric field causes the inter-fluid boundary 1203 to distort as illustrated in FIG. 12B, forming a periodic variation of effective refractive index, i.e. a surface-relief diffraction grating. The light beam 1205 impinging onto the fluidic grating 1200 will diffract, forming first 1231 and second 1232 diffracted sub-beams. By varying the amplitude of the applied voltage V, the strength of the fluidic grating 1200 may be varied. By applying different patterns of the electric field e.g. with individually addressable sub-electrodes or pixels of the first electrode 1221, the grating period and, accordingly, the diffraction angle, may be varied. More generally, varying the effective voltage between separate sub-electrodes or pixels of the first electrode 1221 may result in a three-dimensional conformal change of the fluidic interface i.e. the inter-fluid boundary 1203 inside the fluidic volume to impart a desired optical response to the fluidic grating 1200. The applied voltage pattern may be pre-biased to compensate or offset gravity effects, i.e. gravity-caused distortions of the inter-fluid boundary 1203.

The thickness of the first 1221 and second 1222 electrodes may be e.g. between 10 nm and 50 nm. The materials of the first 1221 and second 1222 electrodes besides ITO may be e.g. indium zinc oxide (IZO), zinc oxide (ZO), indium oxide (TO), tin oxide (TO), indium gallium zinc oxide (IGZO), etc. The first 1201 and second 1202 fluids may have a refractive index difference of at least 0.1, and may be as high as 0.2 and higher. One of the first 1201 or second 1202 fluids may include polyphenylether, 1,3-bis(phenylthio)benzene, etc. The first 1211 and/or second 1212 substrates may include e.g. fused silica, quartz, sapphire, etc. The first 1211 and/or second 1212 substrates may be straight or curved, and may include vias and other electrical interconnects. The applied voltage may be varied in amplitude and/or duty cycle when applied at a frequency of between 100 Hz and 100 kHz. The applied voltage can change polarity and/or be bipolar. Individual first 1201 and/r second 1202 fluid layers may have a thickness of between 0.5-5 micrometers, more preferably between 0.5-2 micrometer.

To separate the first 1201 and second 1202 fluids, surfactants containing one hydrophilic end functional group and one hydrophobic end functional group may be used. The examples of a hydrophilic end functional group are hydroxyl, carboxyl, carbonyl, amino, phosphate, sulfhydryl. The hydrophilic functional groups may also be anionic groups such as sulfate, sulfonate, carboxylates, phosphates, for example. Non-limiting examples of a hydrophobic end functional group are aliphatic groups, aromatic groups, fluorinated groups. For example, when polyphenyl thioether and fluorinated fluid may be selected as a fluid pair, a surfactant containing aromatic end group and fluorinated end group may be used. When phenyl silicone oil and water are selected as the fluid pair, a surfactant containing aromatic end group and hydroxyl (or amino, or ionic) end group may be used. These are only non-limiting examples.

Figure 13A:
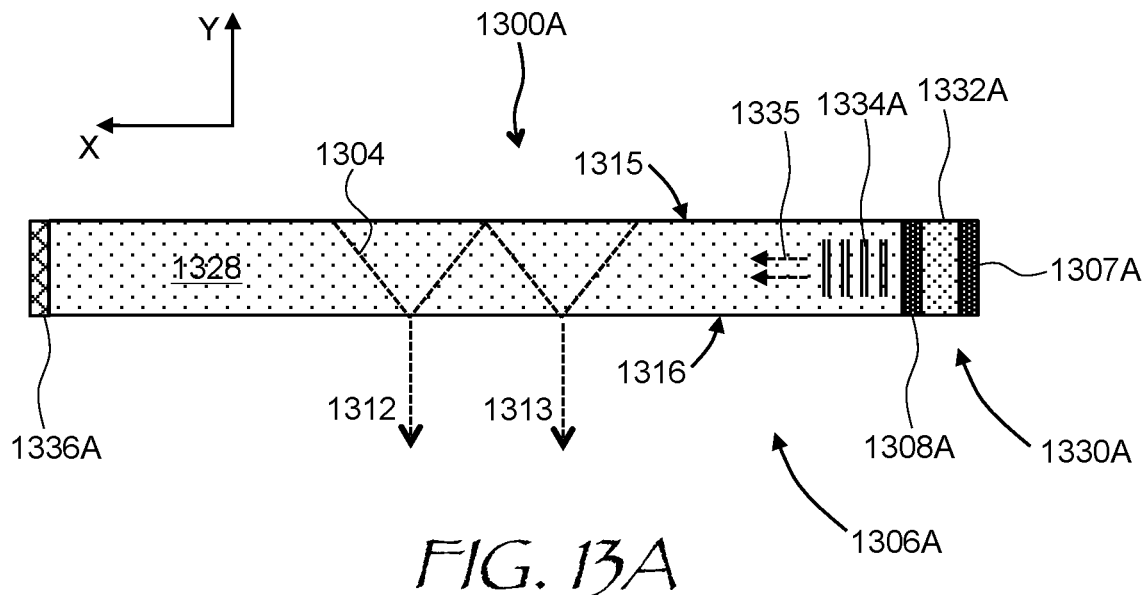
FIG. 13A is a side cross-sectional view of a lightguide including an acoustic actuator for creating a volume acoustic wave in the lightguide.

Referring to FIG. 13A, a pupil-replicating lightguide 1300A of this disclosure includes a body 1306A having two portions, a substrate 1328 for propagating image light 1304, and a volume-wave acoustic actuator 1330A mechanically coupled at a side of the substrate 1328 joining its top 1315 and bottom 1316 surfaces. In the embodiment shown, the volume-wave acoustic actuator 1330A includes an electrically responsive layer 1332A, e.g. a piezoelectric layer, disposed between electrodes 1307A,1308A. In operation, an electrical signal at a high frequency, typically in the range of 1 MHz to 100 MHz or higher, is applied to the electrodes 1307A,1308A causing the electrically responsive layer 1332A to oscillate, typically at a frequency of a mechanical resonance of the electrically responsive layer 1332A. The oscillating thickness of the electrically responsive layer 1332A creates a volume acoustic wave 1334A propagating in the substrate 1328 in a direction 1335, i.e. along the X-axis. The volume acoustic wave 1334A modulates the refractive index of the substrate 1328 due to the effect of photoelasticity. The modulated refractive index creates a diffraction grating that out-couples portions 1312, 1313 of the image light 1304 from the pupil-replicating lightguide 1300A. By changing the strength of the electric signal applied to the volume-wave acoustic actuator 1330A, the strength of the out-coupling grating may be changed. The out-coupling grating may be switched ON and OFF by switching ON and OFF the oscillating electric signal. The grating period may be changed by changing the frequency of the oscillating electric signal. In some embodiments, an acoustic wave terminator 1336A can be coupled to an opposite side of the substrate 1328 to absorb the volume acoustic wave 1334A and thus prevent a standing acoustic wave formation in the substrate 1328. The pupil-replicating lightguide 1300A may be used e.g. in the switchable grating structure 208 of the eye tracking system 200 of FIG. 2, the switchable tracking grating 515, the switchable out-coupling grating 516, the in-coupler 514, and/or the out-coupler 517 of the pupil-replicating lightguide 508 of FIGS. 5 and 6.

Figure 13B:
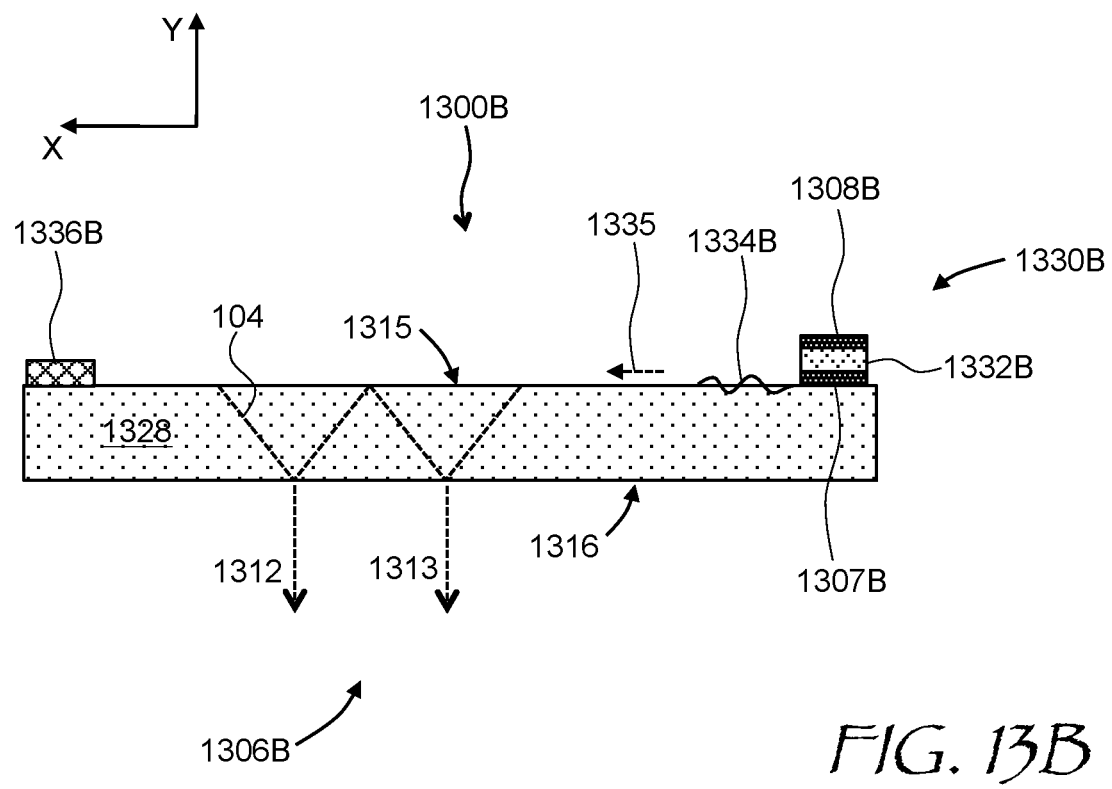
FIG. 13B is a side cross-sectional view of a lightguide including an acoustic actuator for creating a surface acoustic wave in the lightguide.

Turning to FIG. 13B, a pupil-replicating waveguide 1300B of the present disclosure includes a waveguide body 1306B having two portions, the substrate 1328 for propagating the beam of image light 1304, and a surface-wave acoustic actuator 1330B mechanically coupled at the top surface 1315. Alternatively, the surface-wave acoustic actuator 1330B may also be coupled at the bottom surface 1316. In the embodiment shown, the surface-wave acoustic actuator 1330B includes an electrically responsive layer 1332B, e.g. a piezoelectric layer, disposed between electrodes 1307B,1308B. In operation, an electrical signal at a high frequency, typically in the range of 1 MHz to 100 MHz or higher, is applied to the electrodes 1307B,1308B causing the electrically responsive layer 1332B to oscillate. The oscillation of the electrically responsive layer 1332A creates a surface acoustic wave 1334B propagating in the substrate 1328 in the direction 1335, i.e. along the X-axis. The surface acoustic wave 1334B forms a diffraction grating that out-couples the portions 1312, 1313 of the image light 1304 from the pupil-replicating lightguide 1300B. By changing the strength of the electric signal applied to the surface-wave acoustic actuator 1330B, the strength of the surface grating may be changed. The surface grating may be switched ON and OFF by switching ON and OFF the oscillating electric signal. The grating period may be changed by changing the frequency of the oscillating electric signal. In some embodiments, an acoustic wave terminator 1336B can be coupled to an opposite side of the substrate 1328 at the same surface, i.e. at the top surface 1315 in FIG. 13B, to absorb the surface acoustic wave 1334B and thus prevent a standing acoustic wave formation. The pupil-replicating lightguide 1300B may be used e.g. in the switchable grating structure 208 of the eye tracking system 200 of FIG. 2, the switchable tracking grating 515, the switchable out-coupling grating 516, the in-coupler 514, and/or the out-coupler 517 of the pupil-replicating lightguide 508 of FIGS. 5 and 6.

Some switchable gratings include a material with tunable refractive index. By way of a non-limiting example, a holographic polymer-dispersed liquid crystal (H-PDLC) grating may be manufactured by causing interference between two coherent laser beams in a photosensitive monomer/liquid crystal (LC) mixture contained between two substrates coated with a conductive layer. Upon irradiation, a photoinitiator contained within the mixture initiates a free-radical reaction, causing the monomer to polymerize. As the polymer network grows, the mixture phase separates into polymer-rich and liquid-crystal rich regions. The refractive index modulation between the two phases causes light passing through the cell to be scattered in the case of traditional PDLC or diffracted in the case of H-PDLC. When an electric field is applied across the cell, the index modulation is removed and light passing through the cell is unaffected. This is described in an article entitled "Electrically Switchable Bragg Gratings from Liquid Crystal/Polymer Composites" by Pogue et al., Applied Spectroscopy, v. 54 No. 1, 2000, which is incorporated herein by reference in its entirety.

Tunable or switchable gratings with a variable grating period may be produced e.g. by using flexoelectric LC. For LCs with a non-zero flexoelectric coefficient difference (e1−e3) and low dielectric anisotropy, electric fields exceeding certain threshold values result in transitions from the homogeneous planar state to a spatially periodic one. Field-induced grating is characterized by rotation of the LC director about the alignment axis with the wavevector of the grating oriented perpendicular to the initial alignment direction. The rotation sign is defined by both the electric field vector and the sign of the (e1−e3) difference. The wavenumber characterizing the field-induced periodicity is increased linearly with the applied voltage starting from a threshold value of about it/d, where d is the thickness of the layer. A description of flexoelectric LC gratings may be found e.g. in an article entitled "Dynamic and Photonic Properties of Field-Induced Gratings in Flexoelectric LC Layers" by Palto in Crystals 2021, 11, 894, which is incorporated herein by reference in its entirety.

Tunable gratings with a variable grating period or a slant angle may be provided e.g. by using helicoidal LC. Tunable gratings with helicoidal LCs have been described e.g. in an article entitled "Electrooptic Response of Chiral Nematic Liquid Crystals with Oblique Helicoidal Director" by Xiang et al. Phys. Rev. Lett. 112, 217801, 2014, which is incorporated herein by reference in its entirety.

For gratings exhibiting strong wavelength dependence of grating efficiency, several gratings, e.g. several volumetric Bragg grating (VBG) gratings, may be provided in the lightguide. The gratings that diffract light at any given moment of time may be switched by switching the VBG grating on and off, and/or by switching the wavelength of the light propagating in the waveguide.

Figure 14:
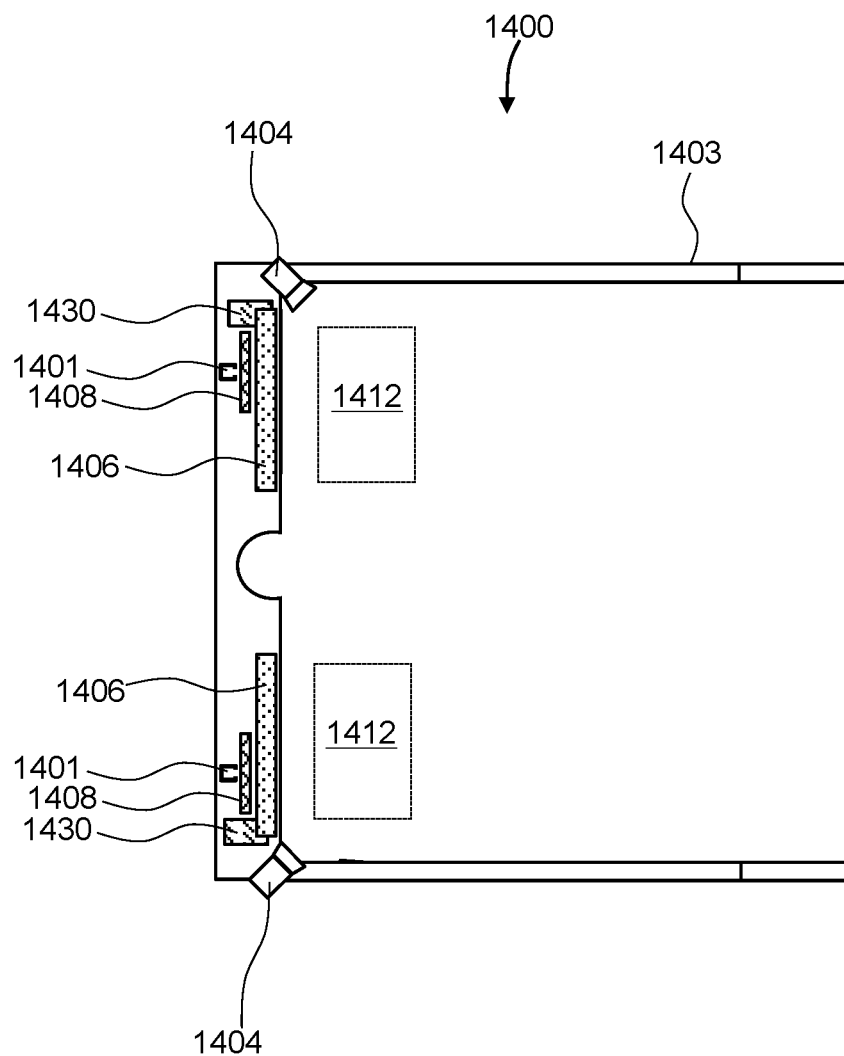
FIG. 14 is a view of an augmented reality (AR) display having a form factor of a pair of eyeglasses.

Referring now to FIG. 14, a near-eye display 1400 is an example implementation of the near-eye display 300 of FIG. 3. The near-eye display 1400 includes a frame 1403 supporting, for each eye: an image projector 1430 for providing an image light beam carrying an image in angular domain, a pupil-replicating lightguide 1406 including any of the waveguides disclosed herein, for providing multiple offset portions of the image light beam to spread the image in angular domain across an eyebox 1412, and a an eye tracking camera 1404. The purpose of the eye tracking cameras 1404 is to determine position and/or orientation of both eyes of the user. The near-eye display 1400 may include a light source 1401 coupled to a switchable grating structure 1408 for redirecting the illuminating light to the eye location as was explained above with reference to FIGS. 2 and 3.

Figure 15:
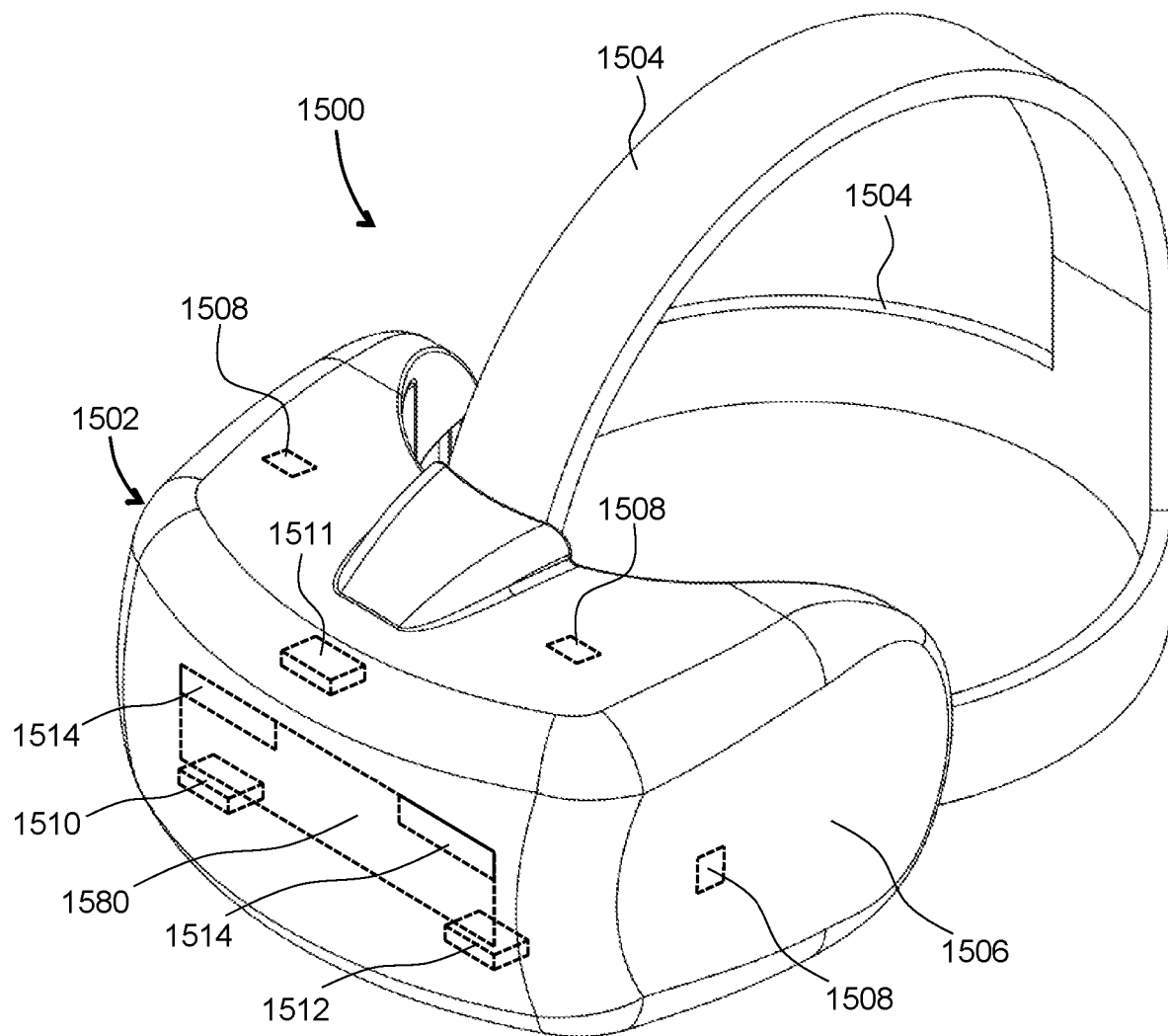
FIG. 15 is a three-dimensional view of a head-mounted display (HMD) of this disclosure.

Turning to FIG. 15, an HMD 1500 is a non-limiting illustrative example of an AR/VR wearable display system which encloses the user's face, for a greater degree of immersion into the AR/VR environment. The HMD 1500 is an example implementation of the near-eye display 300 of FIG. 3 and the near-eye display 500 of FIG. 5. The HMD 1500 may generate the entirely virtual 3D imagery. The HMD 1500 may include a front body 1502 and a band 1504 that can be secured around the user's head. The front body 1502 is configured for placement in front of eyes of a user in a reliable and comfortable manner. A display system 1580 may be disposed in the front body 1502 for presenting AR/VR imagery to the user. The display system 1580 may include any of the display devices and waveguides disclosed herein. Sides 1506 of the front body 1502 may be opaque or transparent.

In some embodiments, the front body 1502 includes locators 1508 and an inertial measurement unit (IMU) 1510 for tracking acceleration of the HMD 1500, and position sensors 1512 for tracking position of the HMD 1500. The IMU 1510 is an electronic device that generates data indicating a position of the HMD 1500 based on measurement signals received from one or more of position sensors 1512, which generate one or more measurement signals in response to motion of the HMD 1500. Examples of position sensors 1512 include: one or more accelerometers, one or more gyroscopes, one or more magnetometers, another suitable type of sensor that detects motion, a type of sensor used for error correction of the IMU 1510, or some combination thereof. The position sensors 1512 may be located external to the IMU 1510, internal to the IMU 1510, or some combination thereof.

The locators 1508 are traced by an external imaging device of a virtual reality system, such that the virtual reality system can track the location and orientation of the entire HMD 1500. Information generated by the IMU 1510 and the position sensors 1512 may be compared with the position and orientation obtained by tracking the locators 1508, for improved tracking accuracy of position and orientation of the HMD 1500. Accurate position and orientation is important for presenting appropriate virtual scenery to the user as the latter moves and turns in 3D space.

The HMD 1500 may further include a depth camera assembly (DCA) 1511, which captures data describing depth information of a local area surrounding some or all of the HMD 1500. The depth information may be compared with the information from the IMU 1510, for better accuracy of determination of position and orientation of the HMD 1500 in 3D space.

The HMD 1500 may further include an eye tracking system 1514 for determining orientation and position of user's eyes in real time. The obtained position and orientation of the eyes also allows the HMD 1500 to determine the gaze direction of the user and to adjust the image generated by the display system 1580 accordingly. The determined gaze direction and vergence angle may be used to adjust the display system 1580 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1502.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An eye tracking system for determining at least one of a position or orientation of an eye at an eyebox, the eye tracking system comprising:
    a light source for providing illuminating light;
    a switchable grating structure optically coupled to the light source for receiving and redirecting the illuminating light to a location of the eye at an eyebox; and
    an eye tracking camera configured for obtaining images of the eye at the eyebox by detecting the illuminating light redirected by the switchable grating and reflected by the eye.

2. The eye tracking system of claim 1, further comprising a controller operably coupled to the switchable grating structure and the eye tracking camera and configured to:
    determine the location of the eye at the eyebox from an image obtained by the eye tracking camera; and
    cause the switchable grating structure to redirect the illuminating light to the location of the eye at the eyebox.

3. The eye tracking system of claim 2, wherein the controller is further configured to determine the orientation of the eye at the eyebox by detecting a glint of the illuminating light in an image obtained by the eye tracking camera, wherein the glint is formed by a reflection of the illuminating light from the eye upon redirecting of the illuminating light to the location of the eye.

4. The eye tracking system of claim 1, wherein the switchable grating structure comprises a switchable polarization volume hologram (PVH) grating.

5. The eye tracking system of claim 1, wherein the switchable grating structure comprises at least one of: a switchable Pancharatnam-Berry phase (PBP) liquid crystal (LC) grating, a switchable surface relief LC grating, or a fluidic grating.

6. The eye tracking system of claim 1, wherein the redirected illuminating light is invisible to the eye.

7. The eye tracking system of claim 6, wherein the light source is an infrared light source.

8. The eye tracking system of claim 1, further comprising an acoustic actuator coupled to a slab of transparent material, wherein the switchable grating structure is formed by an acoustic wave generated by the acoustic actuator in the slab.

9. A near-eye display comprising:
    a projector for providing image light carrying an image in angular domain for viewing by an eye at an eyebox;
    a light source for providing illuminating light for illumination of the eye at the eyebox, wherein the illuminating light is invisible to the eye; and
    a switchable grating structure optically coupled to the light source for receiving and redirecting the illuminating light to a location of the eye at an eyebox.

10. The near-eye display of claim 9, further comprising:
    an eye tracking camera configured for obtaining images of the eye at the eyebox; and a controller operably coupled to the switchable grating structure and the eye tracking camera and configured to:
    determine the location of the eye at the eyebox from an image obtained by the eye tracking camera; and
    cause the switchable grating structure to redirect the illuminating light to the location of the eye at the eyebox.

11. The near-eye display of claim 10, wherein the controller is further configured to determine orientation of the eye at the eyebox by detecting a glint of the illuminating light in an image obtained by the eye tracking camera, wherein the glint is formed by a reflection of the illuminating light from the eye upon redirecting of the illuminating light to the location of the eye.

12. The near-eye display of claim 9, wherein the switchable grating structure comprises a switchable polarization volume hologram (PVH) grating.

13. The near-eye display of claim 9, wherein the switchable grating structure comprises a switchable Pancharatnam-Berry phase (PBP) liquid crystal (LC) grating.

14. The near-eye display of claim 9, wherein the switchable grating structure comprises a switchable surface relief liquid crystal (LC) grating.

15. The near-eye display of claim 9, wherein the switchable grating structure comprises a fluidic grating.

16. The near-eye display of claim 9, further comprising an acoustic actuator coupled to a slab of transparent material, wherein the switchable grating structure is formed by an acoustic wave generated by the acoustic actuator in the slab.

17. A method for determining at least one of a position or orientation of an eye at an eyebox, the method comprising:
    providing illuminating light for illuminating the eye at the eyebox, wherein the illuminating light is invisible to the eye;
    using a switchable grating structure to redirect the illuminating light to a location of the eye at an eyebox; and
    using an eye tracking camera to obtain an image of the eye at the eyebox.

18. The method of claim 17, further comprising:
    determining the location of the eye at the eyebox from the image obtained by the eye tracking camera; and
    causing the switchable grating structure to redirect the illuminating light to the location of the eye at the eyebox.

19. The method of claim 18, further comprising:
    determining the orientation of the eye at the eyebox by detecting a glint of the illuminating light in an image obtained by the eye tracking camera, wherein the glint is formed by a reflection of the illuminating light from the eye upon redirecting of the illuminating light to the location of the eye.

20. The method of claim 17, wherein using the switchable grating structure comprises using at least one of: a polarization volume hologram (PVH) grating; a tunable Pancharatnam-Berry phase (PBP) liquid crystal (LC) grating; a tunable liquid crystal (LC) grating; a fluidic grating; or an acoustic wave generated by an acoustic actuator in a slab of transparent material.

\* \* \* \* \*